United States Patent
Fukuda et al.

(10) Patent No.: US 9,523,757 B2
(45) Date of Patent: Dec. 20, 2016

(54) BROADCASTING DEVICE, COMMUNICATION TERMINAL, AND BROADCASTING SYSTEM

(71) Applicants: Michitaka Fukuda, Kanagawa (JP); Yusuke Matsushita, Kanagawa (JP); Shin Kusakari, Kanagawa (JP); Kunihiro Miyauchi, Kanagawa (JP); Yasuo Ohashi, Kanagawa (JP); Atsushi Kokubo, Kanagawa (JP); Shinji Aoki, Kanagawa (JP); Takaaki Hiroi, Tokyo (JP); Seiji Miyawaki, Kanagawa (JP); Satoshi Kawasaki, Kanagawa (JP)

(72) Inventors: Michitaka Fukuda, Kanagawa (JP); Yusuke Matsushita, Kanagawa (JP); Shin Kusakari, Kanagawa (JP); Kunihiro Miyauchi, Kanagawa (JP); Yasuo Ohashi, Kanagawa (JP); Atsushi Kokubo, Kanagawa (JP); Shinji Aoki, Kanagawa (JP); Takaaki Hiroi, Tokyo (JP); Seiji Miyawaki, Kanagawa (JP); Satoshi Kawasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 741 days.

(21) Appl. No.: 13/919,232

(22) Filed: Jun. 17, 2013

(65) Prior Publication Data
US 2013/0342399 A1 Dec. 26, 2013

(30) Foreign Application Priority Data

Jun. 20, 2012 (JP) .................................. 2012-138694
Oct. 17, 2012 (JP) .................................. 2012-229877

(51) Int. Cl.
G01S 1/08 (2006.01)
G01S 19/00 (2010.01)
(Continued)

(52) U.S. Cl.
CPC .. G01S 1/02 (2013.01); G01S 1/68 (2013.01); G01S 5/0263 (2013.01)

(58) Field of Classification Search
CPC ..................................................... G01S 5/0009
(Continued)

(56) References Cited

U.S. PATENT DOCUMENTS 7,948,437 B2 5/2011 Torimoto et al.
8,280,398 B2 10/2012 Ishii et al.
(Continued)

FOREIGN PATENT DOCUMENTS

JP 2005-158007 6/2005
JP 2006041834 A 2/2006
(Continued)

OTHER PUBLICATIONS

U.S. Appl. No. 13/795,383, filed Mar. 12, 2013.
(Continued)

Primary Examiner — Dao Phan
(74) Attorney, Agent, or Firm — Harness, Dickey & Pierce, P.L.C.

(57) ABSTRACT

A broadcasting device includes a broadcasting unit configured to broadcast positional information indicating an indoor position of the broadcasting device to a predetermined area, wherein the broadcasting unit broadcasts range information indicating the size of the predetermined area together with the positional information.

20 Claims, 35 Drawing Sheets

(51) Int. Cl.
  *G01S 1/02* (2010.01)
  *G01S 1/68* (2006.01)
  *G01S 5/02* (2010.01)

(58) Field of Classification Search
  USPC ...... 342/357.2, 357.21, 357.24, 357.25, 386;
  701/468, 517
  See application file for complete search history.

(56) References Cited

U.S. PATENT DOCUMENTS

| | | | |
|---|---|---|---|
| 8,457,923 B2 | 6/2013 | Ohkubo | |
| 2012/0053889 A1 | 3/2012 | Sambongi | |
| 2013/0084887 A1* | 4/2013 | Akiyama | H04W 52/0245 455/456.1 |
| 2015/0153443 A1* | 6/2015 | Van Taunay | G01S 5/14 702/150 |

FOREIGN PATENT DOCUMENTS

| | | |
|---|---|---|
| JP | 2007078575 A | 3/2007 |
| JP | 4296302 | 7/2009 |
| JP | 2010145355 A | 7/2010 |
| JP | 2011-117843 | 6/2011 |
| JP | 2012052898 A | 3/2012 |
| JP | 2012-145457 | 8/2012 |
| WO | WO2005/086375 A1 | 9/2005 |

OTHER PUBLICATIONS

U.S. Appl. No. 13/784,961, filed Mar. 5, 2013.
Japan Aerospace Exploration Agency, Quasi-Zenith Satellite System Navigation Service, "Interface Specification for Qzss" Ver.1. 4(English), Feb. 28, 2012.
Japanese Office Action mailed on Sep. 6, 2016 for corresponding Japanese Patent Application No. 2012-229877.

* cited by examiner

FIG.6

| FLOOR NUMBER | LATITUDE | LONGITUDE | BUILDING NUMBER |
|---|---|---|---|
| 16 | 35.459555 | 139.387110 | C |

FIG.8

| FLOOR NUMBER: 9 BITS | LATITUDE: 21 BITS | LONGITUDE: 21 BITS | BUILDING NUMBER: 8 BITS |
|---|---|---|---|

FIG.9

| DESTINATION | SENDER | DATA |
|---|---|---|

FIG.13

| TERMINAL IDENTIFICATION INFORMATION A | APPARATUS NAME | OWNER NAME (ADMINISTRATOR NAME) | POSITIONAL INFORMATION X ||||| RECEIVED DATE AND TIME |
|---|---|---|---|---|---|---|---|
| | | | LATITUDE | LONGITUDE | FLOOR NUMBER | BUILDING NUMBER | |
| 002673abcd01 | PJ WX4310 | FIRST SALES SECTION | 35.459555 | 139.387110 | 16 | C | 11/12/12 13:30:01 |
| 002673abcd02 | UCS P3000 | SECOND SALES SECTION | 35.459483 | 139.388437 | 4 | A | 11/12/12 13:30:03 |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

FIG.24

| SEARCH SCREEN | | |
|---|---|---|
| OWNER NAME | APPARATUS NAME | |
| FIRST SALES SECTION | PJ WX4310 | |
| | UCS P3000 | |
| | ... | |
| SECOND SALES SECTION | ... | |
| | PJ WX3231N No.1 | |
| | PJ WX3231N No.2 | |
| | PJ WX3231N No.3 | |

SEARCH

FIG.26

| BIT | REACHABLE RANGE |
|-----|-----------------|
| 0   | SMALL           |
| 1   | LARGE           |

FIG.27

| DEVICE IDENTIFICATION INFORMATION B | POSITIONAL INFORMATION X | | | | REACHABLE RANGE INFORMATION |
|---|---|---|---|---|---|
| | LATITUDE | LONGITUDE | FLOOR NUMBER | BUILDING NUMBER | |
| 21.17.10.10 | 35.459555 | 139.387110 | 16 | C | SMALL |
| 21.17.10.11 | 35.459583 | 139.388437 | 4 | A | LARGE |
| 21.17.10.12 | 35.459550 | 139.389050 | 5 | B | LARGE |
| .. | .. | .. | .. | .. | .. |

FIG.37 RELATED ART

| MID | FRAME LENGTH (WORDS) | CONTENTS | MAXIMUM REPETITION CYCLE(S) (TENTATIVE) |
|---|---|---|---|
| 0 | 3 | POSITION 1 | |
| 1 | 4 | POSITION 2 | 12 |
| 2 | – | RESERVED | – |
| 3 | 1 | SHORT ID | – |
| 4 | 2 | MEDIUM ID | – |
| 5 | – | RESERVED | – |
| 6 | – | RESERVED | – |
| 7 | – | RESERVED | – |

BROADCASTING DEVICE, COMMUNICATION TERMINAL, AND BROADCASTING SYSTEM

CROSS-REFERENCE TO RELATED APPLICATIONS

The present application is based upon and claims the benefit of priority of Japanese Patent Application No. 2012-138694 filed on Jun. 20, 2012, and Japanese Patent Application No. 2012-229877 filed on Oct. 17, 2012, the entire contents of which are incorporated herein by reference.

BACKGROUND OF THE INVENTION

1. Field of the Invention

An aspect of this disclosure is related to a technology for delivering positional information.

2. Description of the Related Art

There exists technology for determining positions of communication terminals of users using a global positioning system (GPS). In the GPS, about 30 GPS satellites orbiting the Earth transmit radio signals indicating time. A communication terminal on the Earth including a GPS receiver receives radio signals from some of the GPS satellites and calculates the distance between the communication terminal and the GPS satellites based on differences between the time the radio signals are transmitted from the GPS satellites and the time the radio signals are received at the communication terminal. Generally, the communication terminal calculates the distances between the communication terminal and at least four GPS satellites, and determines the position of the communication terminal on the Earth based on the calculated distances.

As the size and power consumption of GPS receivers are reduced by recent technological developments, GPS receivers are installed even in small communication terminals such as cell phones that are driven by a battery.

One problem with the GPS is that GPS radio signals can hardly reach communication terminals located in an indoor space (or area). For this reason, a system different from the GPS is desired to measure positions of communication terminals located in an indoor space. As an example of such a system, an indoor messaging system (IMES) is now under the spotlight (e.g. Japanese Patent No. 4,296,302 and Quasi-Zenith Satellite System Navigation Service—Interface Specification for QZSS V1.4 provided by Japan Aerospace Exploration Agency).

A broadcasting device according to the IMES can broadcast a radio signal having the same radio wave format as the radio signal transmitted by GPS satellites. Therefore, a communication terminal can receive the radio signal from the broadcasting device using the same hardware as that used to receive the radio signal from GPS satellites with only minor changes made to reception software. The radio signal broadcast by the broadcasting device includes, instead of time information indicating time, positional information indicating the position of the broadcasting device. Accordingly, a communication terminal receiving the radio signal does not need to calculate the time differences to determine its position as in the outdoors.

In addition, there exists technology for measuring a location or a direction of a pedestrian based on a body movement of the pedestrian (e.g. Japanese Laid-Open Patent Application No. 2011-117843 and No. 2012-145457) with the communication terminal having sensors (e.g. an acceleration sensor, gyroscopic sensor, magnetic sensor, temperature sensor, and/or pressure sensor etc.). The technology is also referred to as Pedestrian Dead Reckoning (PDR).

The communication terminal with an IMES receiver uses both autonomic positioning with IMES and differential positioning with PDR, and allows positional information indicating the current position to be obtained wherever the communication terminal is. Generally, the communication terminal may calculate the positional information using the differential positioning as needed. However, the positional information is obtained by the differential positioning with frequent inaccuracies. Therefore, it is expected that the positional information is replaced with absolute positional information obtained by IMES. However, since a signal from an IMES transmitter is transmitted to a predetermined area, the absolute positional information may have a margin of error. With the related-art method, however, the communication device can not accurately determine which one of the positional information either obtained by PDR or obtained by IMES indicates a more precise current position.

An embodiment of this invention aims to allow the communication terminal to determine the positional information which precisely indicates the current position.

SUMMARY OF THE INVENTION

In an aspect of this disclosure, there is provided a broadcasting device that includes a broadcasting unit configured to broadcast positional information indicating an indoor position of the broadcasting device to a predetermined area; wherein the broadcasting unit broadcasts range information indicating the size of the predetermined area together with the positional information.

According to an embodiment of this invention, the communication terminal may determine positional information which precisely indicates the current position.

BRIEF DESCRIPTION OF THE DRAWINGS

Other objects and further features of embodiments may become apparent from the following detailed description when read in conjunction with the accompanying drawings, in which:

FIG. 6 is a table illustrating exemplary positional information broadcast by a broadcasting device;

FIG. 8 is a drawing illustrating an exemplary format of positional information;

FIG. 9 is a drawing illustrating an exemplary structure of data including positional information;

FIG. 13 is a table illustrating exemplary management information managed by a positional information management system;

FIG. 24 is a drawing illustrating an exemplary screen displayed by a positional information management system;

FIG. 26 is a drawing illustrating an exemplary expression form of reachable range information;

FIG. 27 is a drawing illustrating broadcasting device information managed by a positional information management system;

FIG. 37 is a table illustrating elements defined by IMES for a frame structure.

DESCRIPTION OF THE PREFERRED EMBODIMENTS

In the following, embodiments of the present invention will be described with reference to the accompanying drawings.

Preferred embodiments of the present invention are described below with reference to FIGS. 1 through 25.

Figure 1:
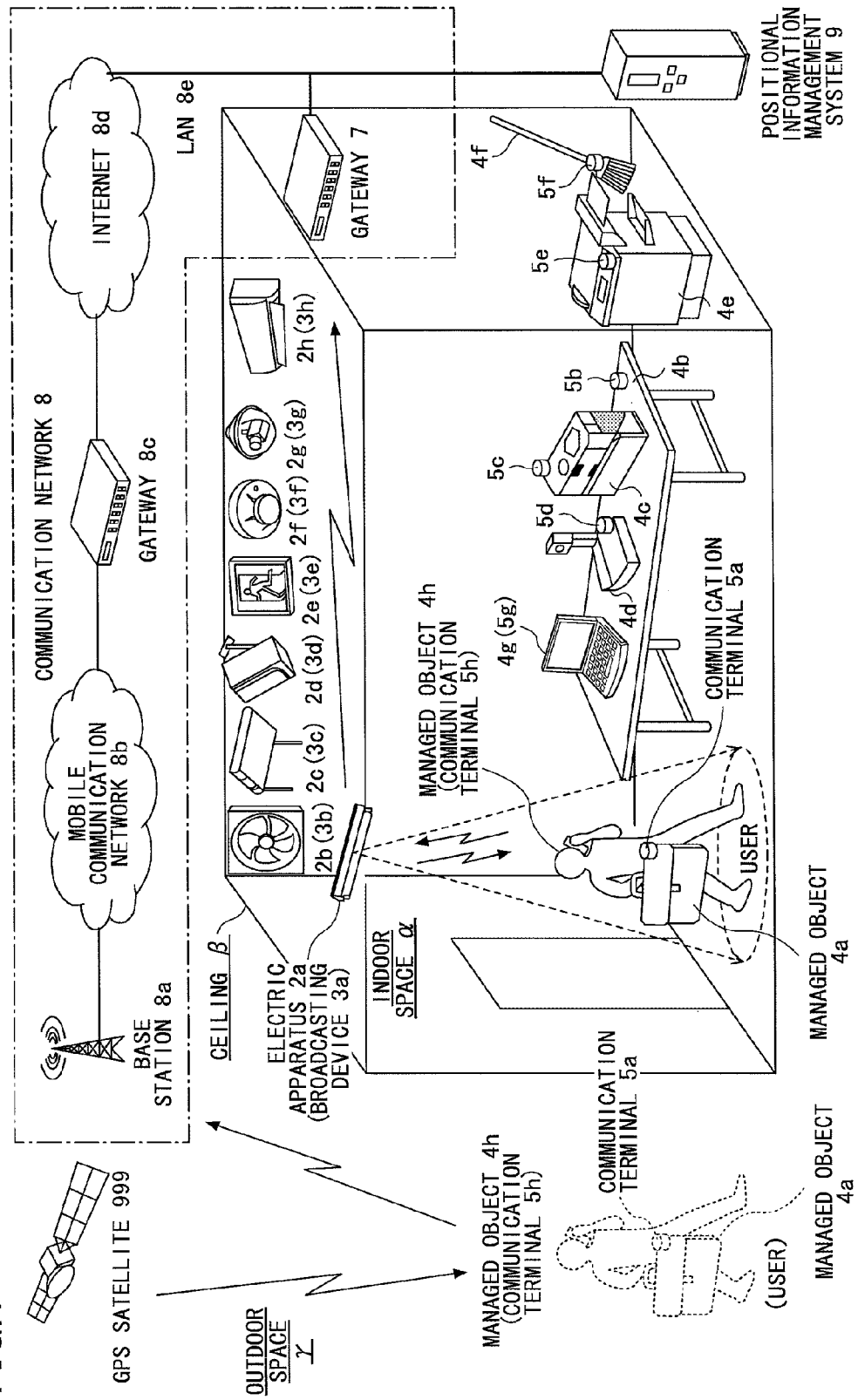
FIG. 1 is a drawing illustrating an exemplary configuration of a position management system according to an embodiment.

An outline of a position management system according to an embodiment is described below with reference to FIG. 1. FIG. 1 is a drawing illustrating an exemplary configuration of a position management system 1 according to the present embodiment.

As illustrated in FIG. 1, the position management system 1 includes plural broadcasting devices 3a, 3b, 3c, 3d, 3e, 3f, 3g, and 3h provided on or near a ceiling β of an indoor space (or area) α, plural communication terminals 5a, 5b, 5c, 5d, 5e, 5f, 5g, and 5h on or near a floor of the indoor space α, and a positional information management system 9.

Each of the broadcasting devices 3a, 3b, 3c, 3d, 3e, 3f, 3g, and 3h stores positional information Xa, Xb, Xc, Xd, Xe, Xf, Xg, or Xh indicating a position where it is installed, and broadcasts the corresponding positional information toward the floor of the indoor space α. Each of the broadcasting devices 3a, 3b, 3c, 3d, 3e, 3f, 3g, and 3h also stores device identification information Ba, Bb, Bc, Bd, Be, Bf, Bg, or Bh for identifying itself.

Below, for descriptive purposes, "broadcasting device 3" may be used as a generic term to refer to any one of the broadcasting devices 3a, 3b, 3c, 3d, 3e, 3f, 3g, and 3h, and "communication terminal 5" may be used as a generic term to refer to any one of the communication terminals 5a, 5b, 5c, 5d, 5e, 5f, 5g, and 5h. Also, "positional information X" may be used as a generic term to refer to the positional information Xa, Xb, Xc, Xd, Xe, Xf, Xg, or Xh, and "device identification information B" may be used as a generic term to refer to device identification information Ba, Bb, Bc, Bd, Be, Bf, Bg, or Bh. The device identification information B may be a media access control (MAC) address.

Each of the communication terminals 5a, 5b, 5c, 5d, 5e, 5f, 5g, and 5h stores terminal identification information Aa, Ab, Ac, Ad, Ae, Af, Ag, or Ah for identifying itself. Hereafter, "terminal identification information A" may be used as a generic term to refer to the terminal identification information Aa, Ab, Ac, Ad, Ae, Af, Ag, or Ah. The terminal identification information A may be a MAC address. When receiving the positional information X from the broadcasting device 3, the communication terminal 5 transmits its terminal identification information A together with the positional information X to the broadcasting device 3.

The broadcasting devices 3 are included in or attached to corresponding electric apparatuses 2a, 2b, 2c, 2d, 2e, 2f, 2g, and 2h installed on the ceiling β of the indoor space α. Hereafter, "electric apparatus 2" may be used as a generic term to refer to any one of the electric apparatuses 2a, 2b, 2c, 2d, 2e, 2f, 2g, and 2h.

The electric apparatuses 2 supply power to the corresponding broadcasting devices 3. The electric apparatus 2a is a fluorescent-type light-emitting diode (LED) lighting apparatus. The electric apparatus 2b is a ventilation fan. The electric apparatus 2c is an access point of a wireless LAN. The electric apparatus 2d is a speaker. The electric apparatus 2e is an emergency light. The electric apparatus 2f is a fire alarm or a smoke alarm. The electric apparatus 2g is a security camera. The electric apparatus 2h is an air conditioner.

Any apparatus other than those illustrated in FIG. 1 may also be used as the electric apparatus 2 as long as it can supply power to the broadcasting device 3. For example, a lighting apparatus using a fluorescent lamp or a light bulb instead of LEDs and a security sensor for detecting intruders may also be used as the electric apparatuses 2.

The communication terminals 5 are attached to managed objects 4a, 4b, 4c, 4d, 4e, and 4f whose positions are managed by the positional information management system 9.

The managed object 4a is a bag. The managed object 4b is a table. The managed object 4c is a projector. The managed object 4d is a videoconference terminal. The managed object 4e is a multifunction peripheral (MFP) including a copy function. The managed object 4f is a broom.

Meanwhile, a managed object 4g is a personal computer including a function of the communication terminal 5. That is, the managed object 4g is also a communication terminal 5g. A managed object 4h is a cell phone such as a smartphone including a function of the communication terminal 5. Therefore, the managed object 4h is also a communication terminal 5h. Hereafter, "managed object 4" may be used as a generic term to refer to any one of the managed objects 4a, 4b, 4c, 4d, 4e, 4f, 4g, and 4h.

Objects other than those illustrated in FIG. 1 may also be used as the managed objects 4. Other examples of managed objects 4 may include a facsimile machine, a scanner, a printer, a copier, an electronic blackboard, an air cleaner, a shredder, a vending machine, a wristwatch, a camera, a game machine, a wheelchair, and a medical device such as an endoscope.

An exemplary positional information management method using the position management system 1 is outlined below. For example, the broadcasting device 3a installed on the ceiling β of the indoor space α broadcasts the positional information Xa indicating the position where the broadcasting device 3a is installed via wireless communications. The communication terminal 5a, for example, receives the positional information Xa. Next, the communication terminal 5a transmits the terminal identification information Aa for identifying the communication terminal 5a and the positional information Xa to the broadcasting device 3a via wireless communications. In other words, the communication terminal 5a sends back the positional information Xa together with the terminal identification information Aa to the broadcasting device 3a.

The broadcasting device 3a receives the terminal identification information Aa and the positional information Xa. Then, the broadcasting device 3a transmits the terminal identification information Aa and the positional information Xa to a gateway 7 via wireless communications. The gateway 7 transmits the terminal identification information Aa and the positional information Xa via a LAN 8e to the positional information management system 9. The positional information management system 9 receives and manages the terminal identification information Aa and the positional information Xa. Accordingly, an administrator of the positional information management system 9 can identify the position of the communication terminal 5a (the managed object 4a) in the indoor space α.

In an outdoor space (or area) γ, as illustrated in FIG. 1, the communication terminals 5g and 5h (among the communication terminals 5) can receive a radio signal (time information, orbit information, etc.) from a GPS satellite 999 and calculate their positions on the Earth based on the radio signal. The communication terminals 5g and 5h can also transmit their terminal identification information Ag, Ah and positional information Xg, Xh to the positional information management system 9 using a 3G (3rd generation) or 4G (4th generation) mobile communication system via a base station 8a, a mobile communication network 8b, a gateway 8c, the Internet 8d, and the LAN 8e.

The base station 8a, the mobile communication network 8b, the gateway 8c, the Internet 8d, the LAN 8e, and the gateway 7 constitute a communication network 8. Although at least three GPS satellites are necessary to measure the latitude and longitude on the Earth (or four GPS satellites to also measure the altitude), only one GPS satellite 999 is illustrated in FIG. 1 for brevity.

Figure 2:
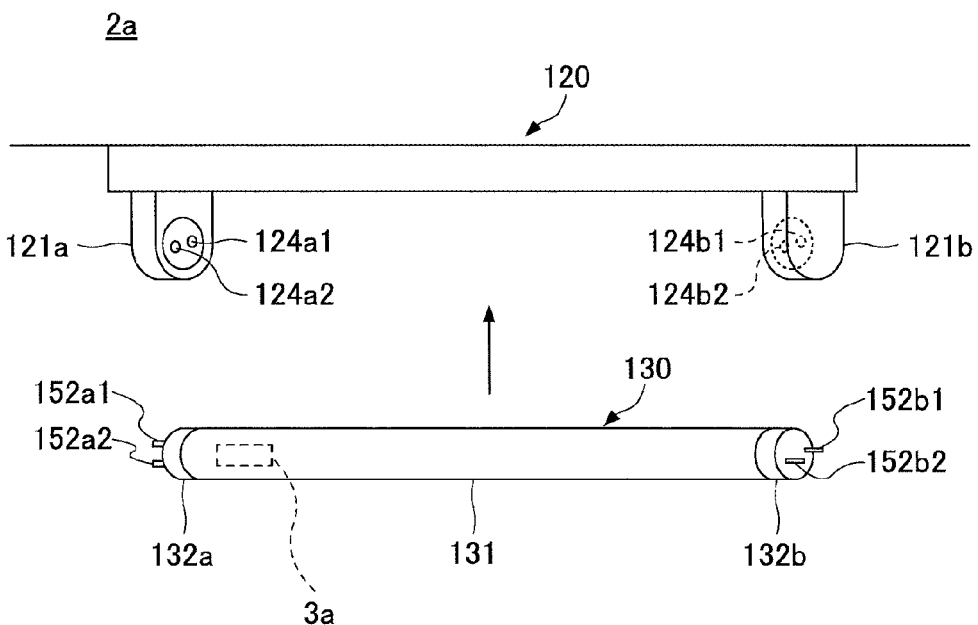
FIG. 2 is a drawing illustrating an exemplary configuration of an electric apparatus implemented as a fluorescent-type LED lighting apparatus.

Next, as an example of the electric apparatus 2, an exemplary configuration of the electric apparatus 2a implemented as a fluorescent-type LED lighting apparatus is described below. FIG. 2 is a drawing electric apparatus 2a.

As illustrated in FIG. 2, the electric apparatus 2a is a straight tube lamp and may include a base unit 120 mounted on the ceiling β of the indoor space α and an LED lamp 130 attached to the base unit 120.

The base unit 120 may include a socket 121a and a socket 121b at the corresponding ends. The socket 121a may include power supply terminals 124a1 and 124a2 for supplying power to the LED lamp 130. The socket 121b may also include power supply terminals 124b1 and 124b2 for supplying power to the LED lamp 130. With the sockets 121a and 121b, the base unit 120 can supply power from a power supply 1000 (see FIG. 4) to the LED lamp 130.

The LED lamp 130 may include a translucent cover 131, caps 132a and 132b provided at the corresponding ends of the translucent cover 131, and the broadcasting device 3a disposed in the translucent cover 131. The translucent cover 131 covers an internal light source and may be made of, for example, a resin material such as acrylic resin.

The cap 132a may include terminal pins 152a1 and 152a2 that are to be connected to the power supply terminals 124a1 and 124a2 of the socket 121a. The cap 132b may include terminal pins 152b1 and 152b2 that are to be connected to the power supply terminals 124b1 and 124b2 of the socket 121b. When the LED lamp 130 is attached to the base unit 120, power is supplied from the base unit 120 via the power supply terminals 124a1, 124a2, 124b1, and 124b2 to the terminal pins 152a1, 152a2, 152b1, and 152b2. When power is supplied, the LED lamp 130 emits light through the translucent cover 131. The broadcasting device 3a is also driven by the power supplied from the base unit 120.

Next, as an example of the managed object 4, the managed object 4b (a table) is described with reference to FIG. 3.

Figure 3:
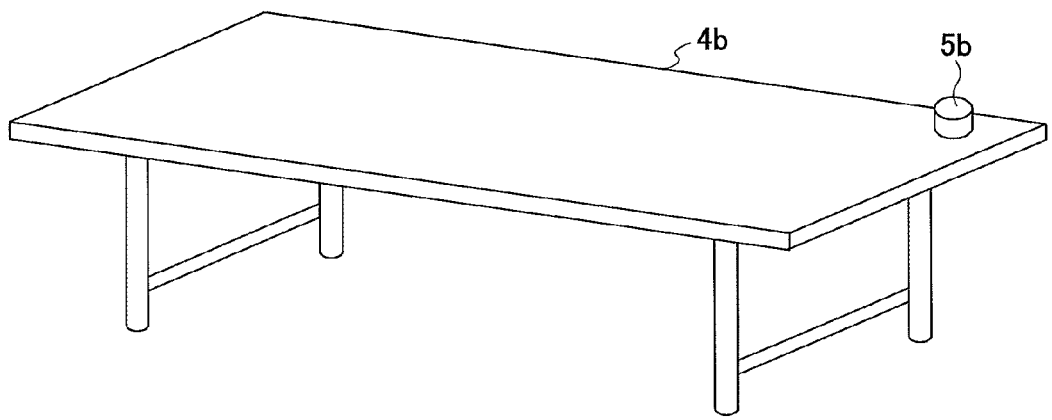
FIG. 3 is a drawing illustrating an example of a communication terminal provided on a managed object.

As illustrated in FIG. 3, the communication terminal 5b is provided on the upper surface of the managed object 4b. For example, the communication terminal 5b may be fixed via a double-sided adhesive tape to the managed object 4b or may be simply placed on the managed object 4b.

Figure 4:
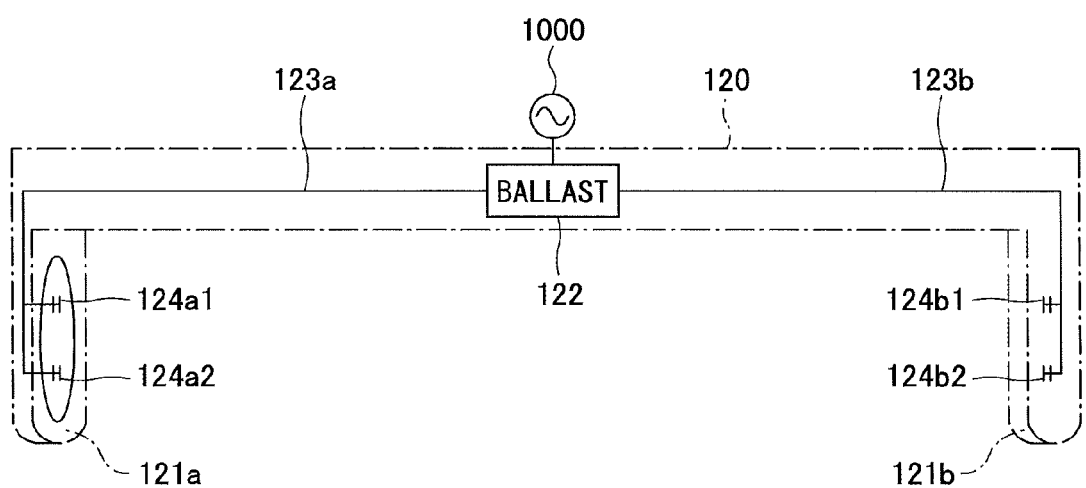
FIG. 4 is a drawing illustrating an exemplary hardware configuration of a base unit of an LED lighting apparatus.
Figure 5:
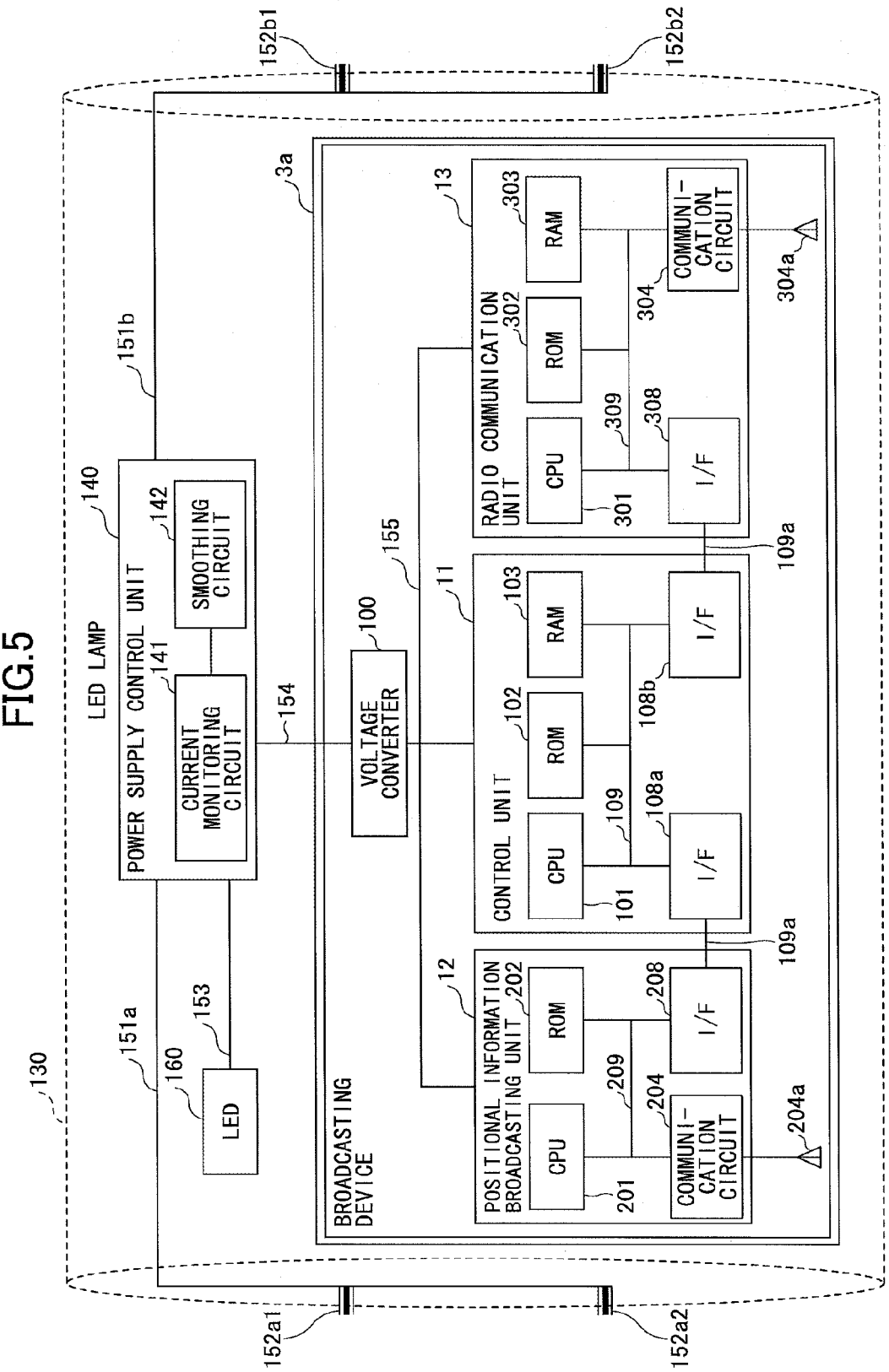
FIG. 5 is a drawing illustrating an exemplary hardware configuration of an LED lamp of a fluorescent-type LED lighting apparatus.

Next, as an example of the electronic apparatus 2, a hardware configuration of the electric apparatus 2a (LED lighting apparatus) is described with reference to FIGS. 4 and 5. FIG. 4 is a drawing illustrating an exemplary hardware configuration of the base unit 120 of the electric apparatus 2a. FIG. 5 is a drawing illustrating an exemplary hardware configuration of the LED lamp 130 of the electric apparatus 2a.

As illustrated in FIG. 4, the base unit 120 may include ballast 122, leads 123a and 123b, and the power supply terminals 124a1, 124a2, 124b1, and 124b2.

The ballast 122 controls a current supplied from the external power supply 1000. The ballast 122 and the power supply terminals 124a1, 124a2, 124b1, and 124b2 are electrically connected to each other via the leads 123a and 123b. With this configuration, it is possible to supply stable power from the ballast 122 via the leads 123a and 123b to the power supply terminals 124a1, 124a2, 124b1, and 124b2.

As illustrated in FIG. 5, the LED lamp 130 may include a power supply control unit 140, leads 151a and 151b, the terminal pins 152a1, 152a2, 152b1, and 152b2, a lead 153, a lead 154, an LED 160, and the broadcasting device 3a. The power supply control unit 140 controls a current output from the power supply 1000 and may include a current monitoring circuit 141 and a smoothing circuit 142. The current monitoring circuit 141 rectifies the current output from the power supply 1000. The smoothing circuit 142 smoothes the current rectified by the current monitoring circuit 141 and supplies power via the leads 151a and 151b to the terminal pins 152a1, 152a2, 152b1, and 152b2.

The power supply control unit 140 and the terminal pins 152a1, 152a2, 152b1, and 152b2 are electrically connected to each other via the leads 151a and 151b. The power supply control unit 140 and the broadcasting device 3a are electrically connected to each other via the lead 154. Although only one LED 160 is illustrated in FIG. 5 for brevity, the LED lamp 130 may include plural LEDs. Except for the broadcasting device 3a, a configuration of a general LED lamp may be used for the LED lamp 130.

Next, the broadcasting device 3a is described. The broadcasting device 3a may include a voltage converter 100, a lead 155, a control unit 11, a positional information broadcasting unit 12, and a radio communication unit 13. The voltage converter 100 is electrically connected via the lead 155 to the control unit 11, the positional information broadcasting unit 12, and the radio communication unit 13.

The voltage converter 100 is an electronic component that converts a voltage of power supplied from the power supply control unit 140 into a drive voltage for driving the broadcasting device 3a and supplies the drive voltage to the control unit 11, the positional information broadcasting unit 12, and the radio communication unit 13.

The control unit 11 may include a central processing unit (CPU) 101 for controlling the operations of the entire control unit 11, a read-only memory (ROM) 102 storing a basic input-output program, a random access memory (RAM) 103 used as a work area by the CPU 101, an interface (I/F) 108a for sending and receiving signals to and from the positional information broadcasting unit 12, an interface (I/F) 108b for sending and receiving signals to and from the radio communication unit 13, and a bus line 109 such as an address bus or a data bus for electrically connecting the components of the control unit 11.

The positional information broadcasting unit 12 may include a CPU 201 for controlling the operations of the entire positional information broadcasting unit 12, a ROM 202 storing a basic input-output program and positional information Xa, a communication circuit 204 and an antenna 204a for broadcasting the positional information Xa, an interface (I/F) 208 for sending and receiving signals to and from the control unit 11, and a bus line 209 such as an address bus or a data bus for electrically connecting the components of the positional information broadcasting unit 12.

The communication circuit 204 broadcasts the positional information Xa from the antenna 204a according to an indoor messaging system (IMES) that is one of indoor positioning technologies called "indoor GPS". In FIG. 1, the reachable range (broadcast range) of the positional information X is indicated by a dotted line. According to the IMES of the present embodiment, the transmission power is set such that the radius of a virtual circle on the floor of the indoor space α indicating the reachable range of the positional information X becomes about 5 m when the ceiling height of the indoor space α is about 3 m. The radius of the virtual circle may be decreased or increased by changing the setting of the transmission power.

The positional information Xa indicates the position where the electric apparatus 2a (implemented as a fluorescent-type LED lighting apparatus) is installed. FIG. 6 is a table illustrating an exemplary configuration of the positional information Xa. As illustrated in FIG. 6, the positional information Xa may include a floor number, a latitude, a longitude, and a building number.

The floor number indicates the floor of a building where the electric apparatus 2a is installed. The latitude and longitude indicate the latitude and longitude of the position where the electric apparatus 2a is installed. The building number indicates the building where the electric apparatus 2a is installed. According to the example of FIG. 6, the electric apparatus 2a is installed at latitude 35.459555 north and longitude 139.387110 east on the 16th floor of a building C. Alternatively, the latitude may be represented by a south latitude and the longitude may be represented by a west longitude.

Referring back to FIG. 5, the radio communication unit 13 may include a CPU 301 for controlling the operations of the entire radio communication unit 13, a ROM 302 storing a basic input-output program and device identification information Ba, a RAM 303 used as a work area by the CPU 301, a communication circuit 304 and an antenna 304a for receiving the positional information Xa and the terminal identification information Aa and transmitting the received information to the gateway 7, an interface (I/F) 308 for sending and receiving signals to and from the control unit 11, and a bus line 309 such as an address bus or a data bus for electrically connecting the components of the radio communication unit 13.

The radio communication unit 13 transmits and receives data using a 920 MHz band. Since a radio wave of the 920 MHz band has high reachability, the broadcasting device 3a can transmit data to the gateway 7 even when pillars and walls exist between the broadcasting device 3a and the gateway 7.

The communication circuit 304 may support at least the physical layer standard in the architecture model of IEEE 802.15.4 standards, and transmits and receives data via the antenna 304a. In this case, a media access control (MAC) address may be used as the device identification information B for identifying the broadcasting device 3 (the radio communication unit 13).

Also, the communication circuit 304 may support ZigBee (registered trademark) that employs the physical layer and the MAC layer in the architecture model of IEEE 802.15.4 standards. In this case, the broadcasting device 3 may use a 800 MHz band, a 900 MHz band, or a 2.4 GHz band depending on the area (e.g., Japan, USA, or Europe) it is used, and can transmit data via another adjacent broadcasting device 3 to the gateway 7. Transmitting data via one or more other broadcasting devices 3 may be referred to as a "multi-hop communication". Although the multi-hop communication necessitates extra time for a routing process, it enables the radio communication unit 13 to transmit data with small transmission power that is sufficient for the data to reach a nearby broadcasting device 3 and thereby makes it possible to reduce driving power of the radio communication unit 13.

The positional information Xa may be stored by the manufacturer in a storage unit 29 (see FIG. 14) before factory shipment of the broadcasting device 3a, or may be stored in the storage unit 29 by the user when installing the electric apparatus 2a on the ceiling β after factory shipment of the broadcasting device 3a. Also, the positional information Xa may be wirelessly received by the communication circuit 304 of the radio communication unit 13 via the gateway 7 from an external apparatus such as the positional information management system 9, and stored via the control unit 11 in the ROM 202 of the positional information broadcasting unit 12.

An exemplary hardware configuration of the communication terminal 5 is described below with reference to FIG. 7.

Figure 7:
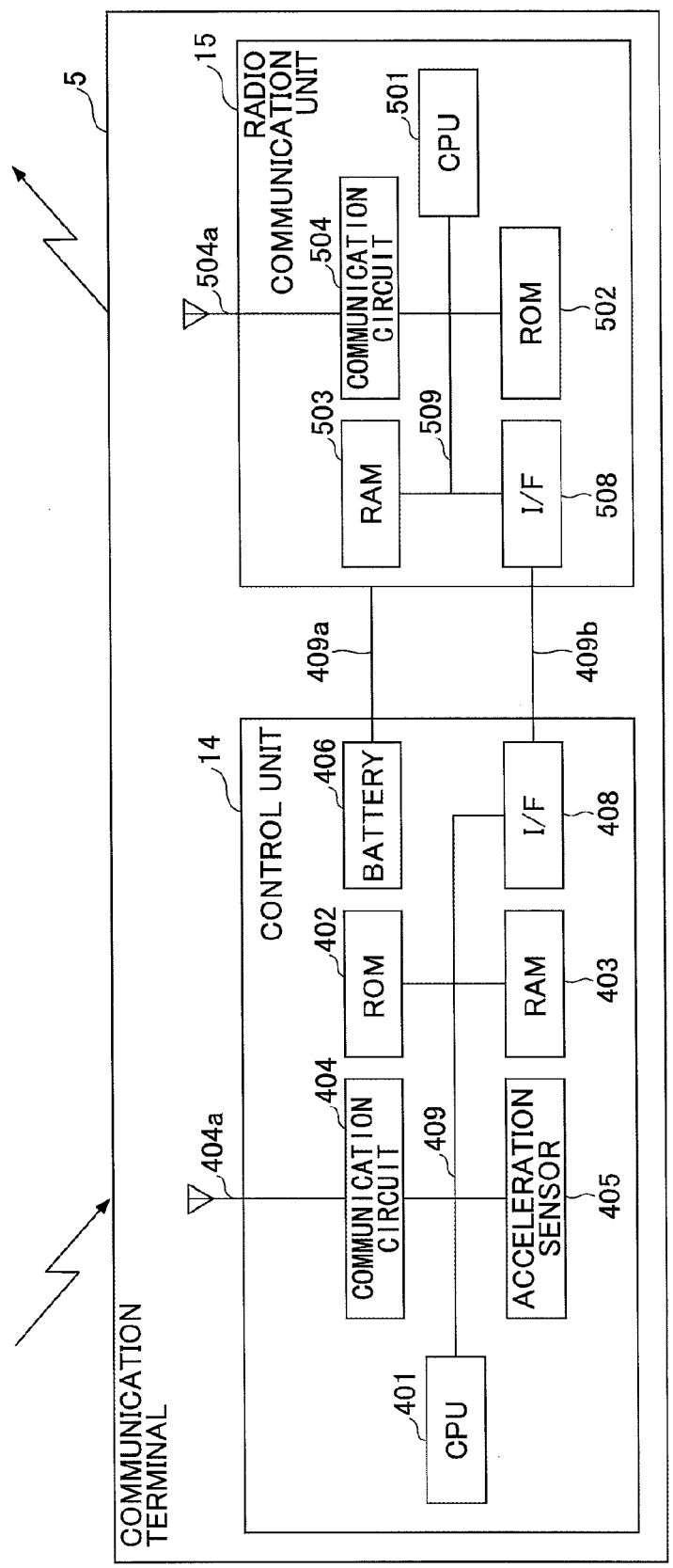
FIG. 7 is a block diagram illustrating an exemplary hardware configuration of a communication terminal.

As illustrated in FIG. 7, the communication terminal 5 may include a control unit 14 and a radio communication unit 15.

The control unit 14 may include a CPU 401 for controlling the operations of the entire control unit 14, a ROM 402 storing a basic input-output program, a RAM 403 used by the CPU 401 as a work area, a communication circuit 404 and an antenna 404a for receiving the positional information X, an acceleration sensor 405 for detecting acceleration, an interface (I/F) 408 for sending and receiving signals to and from the radio communication unit 15, and a bus line 409 such as an address bus or a data bus for electrically connecting the components of the control unit 14. The control unit 14 also includes a button battery 406 for driving the control unit 14. The button battery 406 may be replaced with any other type of battery such as a dry battery (e.g., AA, AAA) or a special battery for the communication terminal 5.

The communication circuit 404 receives, via an antenna 404a, the positional information X broadcast via the IMES. The control unit 14 supplies power from the button battery 406 via a connector 409a to the radio communication unit 15. Also, the control unit 14 sends and receives data (or signals) via the I/F 408 and a connector 409b to and from the radio communication unit 15.

An acceleration sensor 405 detects changes in acceleration of the communication terminal 5. Changes in acceleration may be detected, for example, when the communication terminal 5 starts moving, stops moving, or is tilted. When a change in acceleration is detected while the CPU 401 is not in operation, the acceleration sensor 405 sends a signal for causing the CPU 401 to start a process. When receiving the signal, the CPU 401 starts its process and sends a signal for causing the communication circuit 404 to start a process. As a result, the communication circuit 404 of the communication terminal 5 starts receiving the positional information X via the antenna 404a from the broadcasting device 3.

The radio communication unit 15 has substantially the same configuration as the radio communication unit 13 of the broadcasting apparatus 3 and uses the same frequency band as the radio communication unit 13 to send and receive data to and from the radio communication unit 13. As illustrated in FIG. 7, the radio communication unit 15 may include a CPU 501 for controlling the operations of the entire radio communication unit 15, a ROM 502 storing a basic input-output program and terminal identification information A, a RAM 503 used as a work area by the CPU 501, a communication circuit 504 and an antenna 504a for transmitting the positional information X and the terminal identification information A, an interface (I/F) 508 for sending and receiving signals to and from the control unit 14, and a bus line 509 such as an address bus or a data bus for electrically connecting the components of the radio communication unit 15. The radio communication unit 15 may also support ZigBee.

The communication circuit 504, in response to an instruction from the CPU 501, obtains the positional information X stored in the RAM 403 of the control unit 14 via the connector 409b. Also, the communication circuit 504 reads the terminal identification information A from the ROM 502, and transmits the terminal identification information A and the positional information X via the antenna 504a to the broadcasting device 3.

The positional information X transmitted by the communication circuit 504 may have a format as illustrated in FIG. 8. In the example of FIG. 8, the positional information X includes a floor number field of 9 bits, a latitude field of 21 bits, a longitude field of 21 bits, and a building number field of 8 bits. The formats of these fields may conform to the IMES standard. In practice, headers and a checksum defined by a communication scheme are added to these fields to form a data structure as illustrated in FIG. 9. In the example of FIG. 9, a data structure includes a destination, a sender, and data (including the positional information X).

An exemplary hardware configuration of the managed object 4h (communication terminal 5h) implemented as a cell phone is described below with reference to FIG. 10.

Figure 10:
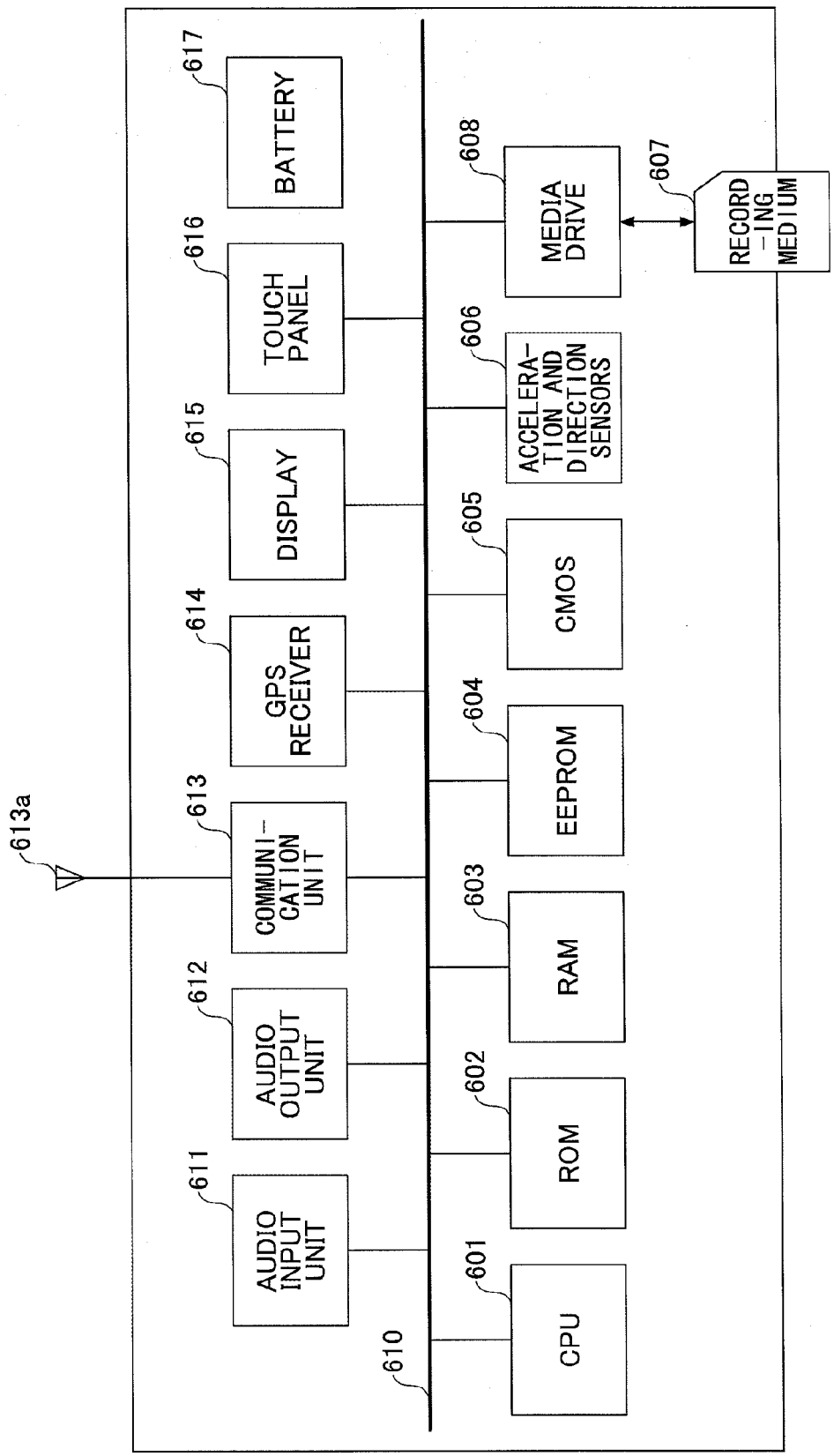
FIG. 10 is a block diagram illustrating a hardware configuration of a cell phone that is an example of a managed object.

As illustrated in FIG. 10, the managed object 4h (communication terminal 5h) includes a CPU 601 for controlling the operations of the entire communication terminal 5h; a ROM 602 storing a basic input-output program; a RAM 603 used by the CPU 601 as a work area; an electrically erasable programmable ROM (EEPROM) 604 to and from which data is written and read under the control of the CPU 601; a complementary metal oxide semiconductor (CMOS) sensor 605 that takes an image of an object and obtains image data under the control of the CPU 601; acceleration and direction sensors 606 including, for example, an electromagnetic compass for detecting geomagnetism, a gyrocompass, and an acceleration sensor; and a media drive 608 for writing and reading data to and from a recording medium 607 such as a flash memory. The recording medium 607 is attachable to and detachable from the media drive 608.

The EEPROM 604 stores, for example, an operating system (OS) and other programs to be executed by the CPU 601 and various data. The CMOS sensor 605 converts light into electric charges to obtain an electronic image of an object. Instead of the CMOS sensor 605, any sensor such as a charge-coupled device (CCD) sensor may be used as long as it can take an image of an object.

The managed object 4h (communication terminal 5h) may also include an audio input unit 611 for converting a sound into an audio signal; an audio output unit 612 for converting an audio signal into a sound; an antenna 613a; a communication unit 613 that communicates with a nearby base station 8a by sending and receiving radio signals via the antenna 613a; a GPS receiver 614 for receiving a GPS signal from the GPS satellite 999; a display 615 such as a liquid crystal display or an organic light emitting display for displaying, for example, images of objects and icons; a pressure-sensitive or electrostatic touch panel 616 that is placed on the display 615 and detects a position on the display 615 touched by a finger or a pen; and a bus line 610 such as an address bus or a data bus for electrically connecting the components of the managed object 4h. The managed object 4h (communication terminal 5h) may further include a dedicated battery 617 for driving the managed object 4h. The audio input unit 611 includes a microphone for inputting a sound, and the audio output unit 612 includes a speaker for outputting a sound.

The GPS receiver 614 of the managed object 4h (communication terminal 5h) may have substantially the same configuration as that of a GPS receiver of a general cell phone. However, firmware stored in the ROM 602 is fine-tuned so that the GPS receiver 614 can seamlessly receive data from the broadcasting devices 3 in the indoor space α and GPS satellites in the outdoor space γ. The acceleration and direction sensors 606 include the function of the acceleration sensor 605 illustrated in FIG. 7.

The hardware configuration of the managed object 4g (communication terminal 5g) implemented as a personal computer is substantially the same as that of the positional information management system 9 described later with reference to FIG. 12, and therefore its description is omitted here. One difference of the managed object 4g (communication terminal 5g) from the positional information management system 9 is that a GPS antenna is connected to an external apparatus I/F 916 such as a universal serial bus (USB) connector illustrated in FIG. 12. However, when a personal computer including a GPS antenna is used as the managed object 4g (communication terminal 5g), it is not necessary to connect a GPS antenna to the external apparatus I/F 916.

An exemplary hardware configuration of the gateway 7 is described below with reference to FIG. 11.

Figure 11:
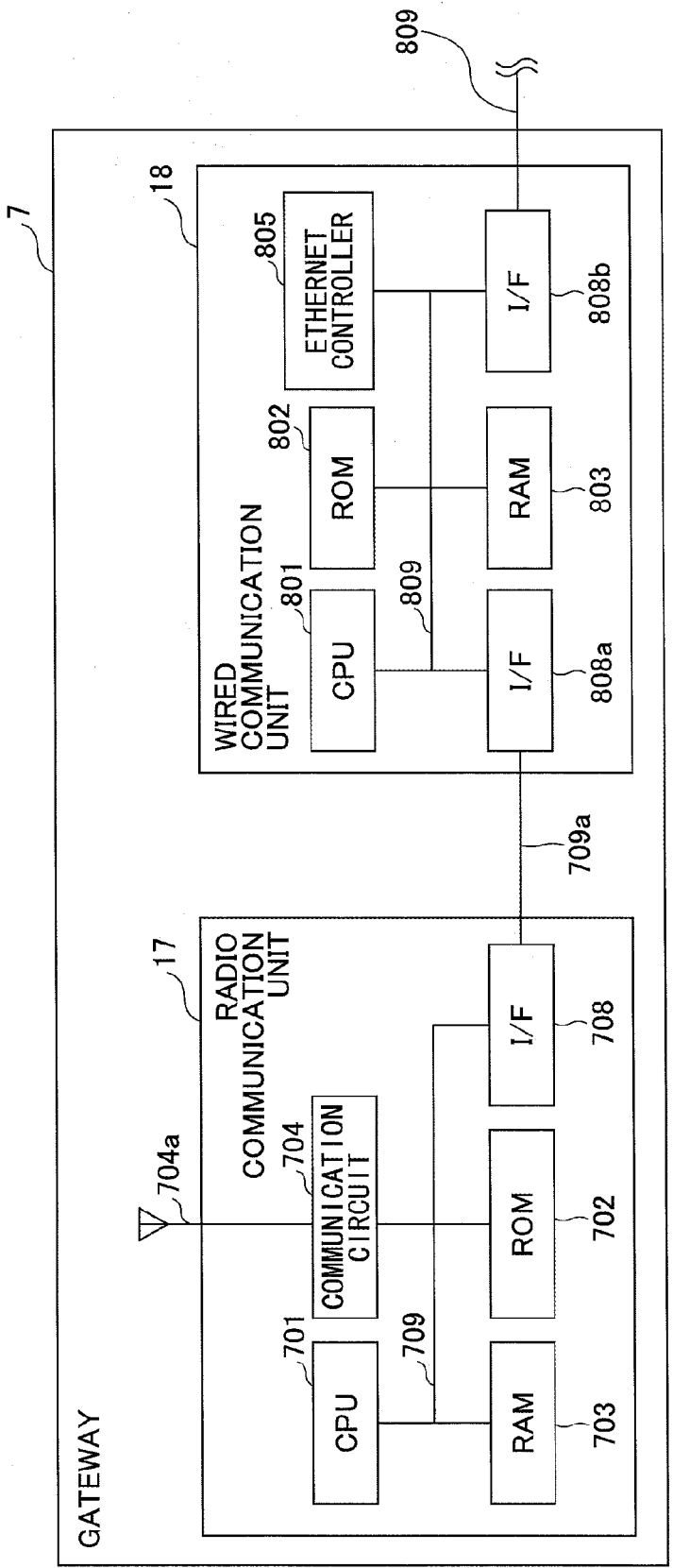
FIG. 11 is a block diagram illustrating an exemplary hardware configuration of a gateway.

As illustrated in FIG. 11, the gateway 7 may include a radio communication unit 17 and a wired communication unit 18.

The radio communication unit 17 has substantially the same configuration as that of the radio communication unit 13 of the broadcasting apparatus 3 and uses the same frequency band as the radio communication unit 13 to send and receive data to and from the radio communication unit 13. As in FIG. 11, the radio communication unit 17 may include a CPU 701 for controlling the operations of the entire radio communication unit 17, a ROM 702 storing a basic input-output program and device identification information C, a RAM 703 used as a work area by the CPU 701, a communication circuit 704 and an antenna 704a for transmitting the positional information X, an interface (I/F) 708 for sending and receiving signals to and from the wired communication unit 18, and a bus line 709 such as an address bus or a data bus for electrically connecting the components of the radio communication unit 17. The radio communication unit 17 sends and receives signals via the I/F 708 and a connector 709a to and from the wired communication unit 18.

The radio communication unit 17 may also support Zig-Bee. The device identification information C is unique information for identifying the gateway 7 (or the radio communication unit 17). For example, the device identification information C may be a MAC address.

Also as illustrated in FIG. 11, the wired communication unit 18 may include a CPU 801 for controlling the operations of the entire wired communication unit 18, a ROM 802 storing a identification information D, a RAM 803 used as a work area by the CPU 801, an Ethernet controller 805, an interface (I/F) 808a for sending and receiving signals to and from the radio communication unit 17, an interface (I/F) 808b for sending and receiving data (signals) via a cable 809 to and from the LAN 8e, and a bus line 809 such as an address bus or a data bus for electrically connecting the components of the wired communication unit 18.

The CPU 801 and the Ethernet controller 805 convert data (or information) transmitted from the broadcasting device 3 according to a communication scheme (communication protocol) conforming to IEEE 802.15.4 into Ethernet packets for packet communications according to a communication scheme (communication protocol) conforming to IEEE 802.3.

The device identification information D is unique information for identifying the gateway 7 (or the wired communication unit 18). For example, the device identification information D may be an Internet protocol (IP) address. The ROM 802 may also store a MAC address the description of which is omitted here for brevity.

An exemplary hardware configuration of the positional information management system 9 is described below with reference to FIG. 12.

The positional information management system 9 may be implemented by a computer. As illustrated in FIG. 12, the positional information management system 9 may include a CPU 901 for controlling the operations of the entire positional information management system 9; a ROM 902 storing programs such as an initial program loader (IPL) for driving the CPU 901; a RAM 903 used by the CPU 901 as a work area; a hard disk (HD) 904 storing various programs and data and system identification information E for the positional information management system 9; a hard disk drive (HDD) 905 for reading and writing data from and to the HD 904 under the control of the CPU 901; a media drive 907 for reading and writing data from and to a recording medium 906 such as a flash memory; a display 908 for displaying information such as a cursor, menus, windows, text, and images; a network I/F 909 for data communications via the communication network 8; a keyboard 911 including keys for entering, for example, characters, numerals, and commands; a mouse 912 for selecting and executing commands, selecting objects, and moving a cursor; a compact disk read-only memory (CD-ROM) drive 914 for reading and writing data from and to a CD-ROM 913 that is an example of a removable recording medium; a communication circuit 915 and an antenna 915a for radio communications; an external apparatus I/F 916 for connecting an external apparatus; and a bus line 910 such as an address bus or a data bus for electrically connecting the components of the positional information management system 9.

The device identification information E is unique information for identifying the positional information management system 9. For example, the system identification information E may be an IP address. The ROM 902 may also store a MAC address the description of which is omitted here for brevity.

Figure 25:
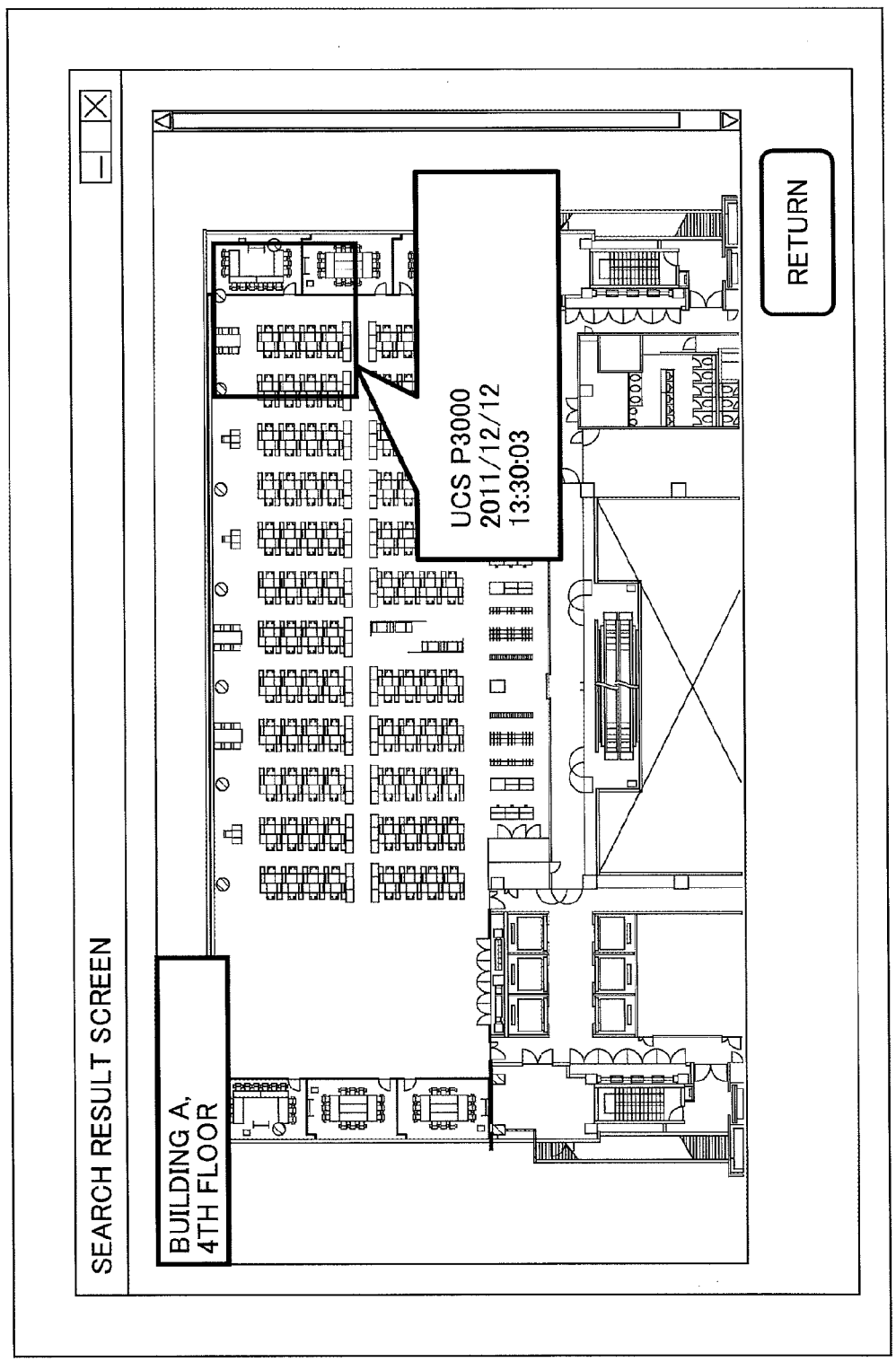
FIG. 25 is a drawing illustrating an exemplary screen displayed by a positional information management system.

The HD 904 may store management information F as illustrated by FIG. 13 and layout information G of, for example, a floor as illustrated in FIG. 25. FIG. 13 is a table illustrating exemplary management information managed by the positional information management system 9.

As illustrated in FIG. 13, the management information F may include records each including terminal identification information A, an apparatus name, an owner name (administrator name), positional information X, and received date and time that are associated with each other.

The terminal identification information A identifies the communication terminal 5. The apparatus name indicates the name of the managed device 4 or the communication terminal 5. The owner name (administrator name) indicates the name of the owner or administrator of the communication terminal 5. The positional information X indicates the position of the broadcasting device 3 as illustrated by FIG.

6. The received date and time indicates the date and time when the positional information X is received by the positional information management system 9 from the gateway 7.

One or more sets of terminal identification information A, apparatus names, and owner names (administrator names) are stored in advance in the positional information management system 9 and are associated with each other. When positional information X and terminal identification information A are received from the gateway 7, the positional information management system 9 adds the positional information X and the received date and time to a record in the management information F that includes the corresponding terminal identification information A.

Also, when positional information X and terminal identification information A are newly received from the gateway 7 for a record that already includes positional information X and received date and time, the positional information management system 9 overwrites the existing positional information X with the newly-received positional information X and updates the received date and time.

Alternatively, instead of overwriting the existing positional information X and updating the received date and time, the positional information management system 9 may be configured to create a new record for the newly-received positional information X.

Next, exemplary functional configurations of the positional management system 1 are described with reference to FIGS. 14 through 16. Also, the correspondence between the functional configurations illustrated in FIGS. 14 through 16 and the hardware configurations illustrated in FIGS. 5, 7, and 10 through 12 is briefly described below.

Figure 14:
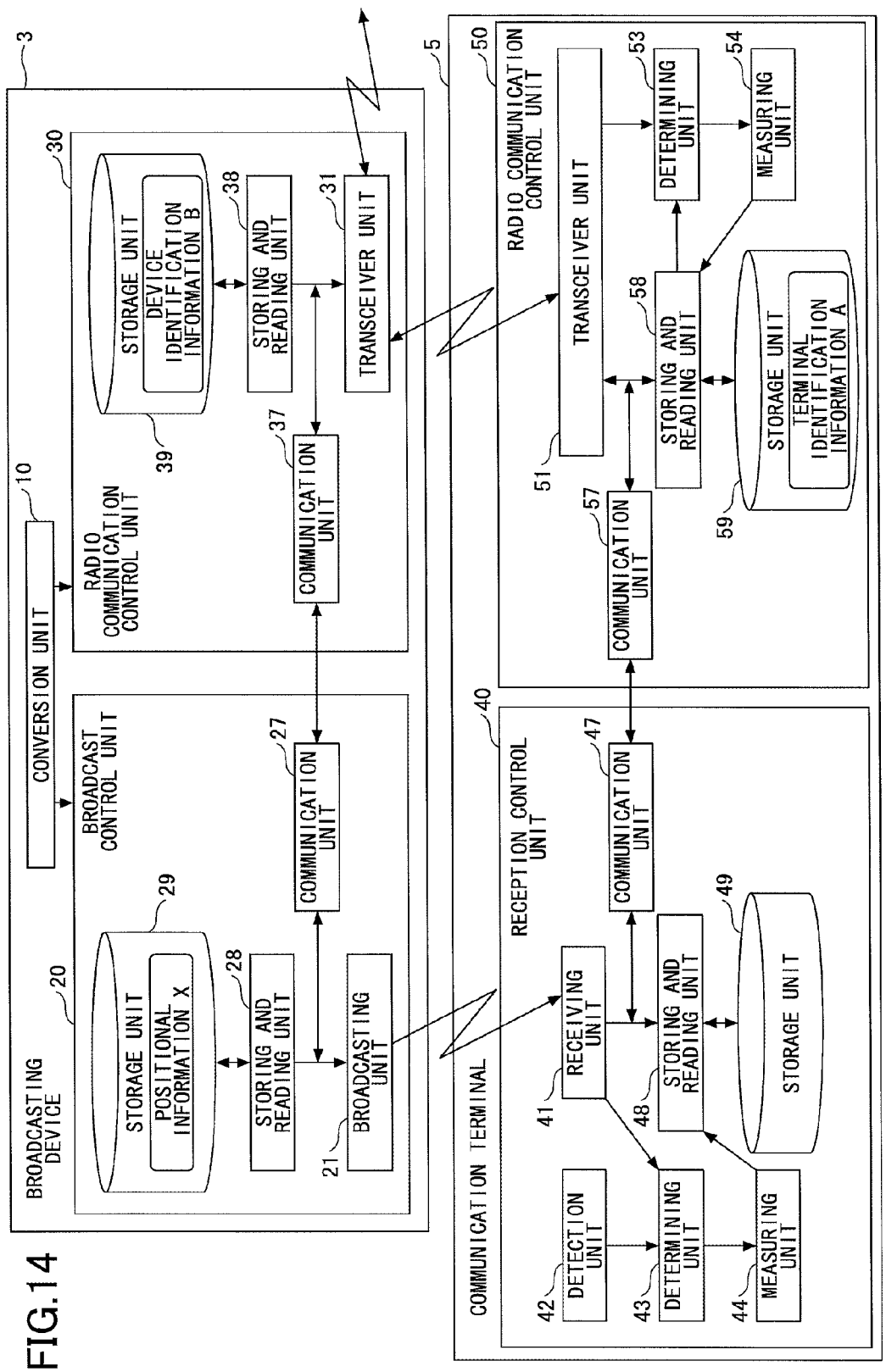
FIG. 14 is a block diagram illustrating exemplary functional configurations of a broadcasting device and a communication terminal.

FIG. 14 is a block diagram illustrating exemplary functional configurations of the broadcasting device 3 and the communication terminal 5. As illustrated in FIG. 14, the broadcasting device 3 includes, as functional units, a conversion unit 10, a broadcast control unit 20, and a radio communication control unit 30. The conversion unit 10 is implemented by operations of the voltage converter 100 illustrated in FIG. 5.

The broadcast control unit 20 is implemented by operations of the control unit 11 and the positional information broadcasting unit 12 illustrated in FIG. 5. The radio communication control unit 30 is implemented by operations of the control unit 11 and the radio communication unit 13 illustrated in FIG. 5.

The broadcast control unit 20 includes a storage unit 29 implemented by the ROM 202 illustrated in FIG. 5. The storage unit 29 stores the positional information X. The broadcast control unit 20 may also include a broadcasting unit 21, a communication unit 27, and a storing and reading unit 28.

The broadcasting unit 21 is implemented mainly by operations of the CPU 201 and the communication circuit 204 illustrated in FIG. 5 and broadcasts the positional information X within a broadcast range.

The communication unit 27 is implemented mainly by operations of the CPUs 101 and 201, the I/F 108a, the I/F 208, and the bus lines 109 and 209 illustrated in FIG. 5, and communicates data (or signals) with the radio communication control unit 30.

The storing and reading unit 28 is implemented by operations of the CPUs 101 and 201, and stores and reads data in and from the storage unit 29. For example, the storing and reading unit 28 stores and reads the positional information X in and from the storage unit 29.

The radio communication control unit 30 may include a transceiver unit 31, a communication unit 37, a storing and reading unit 38, and a storage unit 39. The storage unit 39 is implemented by the RAM 303 illustrated in FIG. 5 and stores the device identification information B.

The transceiver unit 31 is implemented mainly by operations of the CPU 301 and the communication circuit 304 illustrated in FIG. 5, and sends and receives data to and from the communication terminal 5 and the gateway 7 via wireless communications.

The communication unit 37 is implemented mainly by operations of the CPUs 101 and 301, the I/F 108a, the I/F 308, and the bus lines 109 and 309 illustrated in FIG. 5, and communicates data (or signals) with the broadcast control unit 20.

The storing and reading unit 38 stores and reads data in and from the storage unit 39.

Next, an exemplary functional configuration of the communication terminal 4 is described.

The communication terminal 5 may include, as functional units, a reception control unit 40 and a radio communication control unit 50.

The reception control unit 40 may include a storage unit 49 implemented by the RAM 403 illustrated in FIG. 7. The storage unit 49 stores the positional information X broadcast by the broadcasting device 3. The reception control unit 40 may also include a receiving unit 41, a detection unit 42, a determining unit 43, a measuring unit 44, a communication unit 47, and a storing and reading unit 48.

The receiving unit 41 is implemented mainly by operations of the CPU 401 and the communication circuit 404 illustrated in FIG. 7 and receives the positional information X broadcast by the broadcasting device 3. The receiving unit 41 switches between a state where it can receive the positional information X and a state where it cannot receive the positional information X.

The detection unit 42 is implemented mainly by operations of the CPU 401 and the acceleration sensor 405 illustrated in FIG. 7, and is configured to detect movement (including a tilt) of the communication terminal 5 and causes the receiving unit 41 to start a process. Instead of the acceleration sensor 405, the detection unit 42 may be implemented by a motion sensor that detects movement of the communication terminal 5 based on inertial force and/or magnetism.

The determining unit 43 is implemented mainly by operations of the CPU 401 illustrated in FIG. 7 and determines whether at least one set of positional information X has been received by the receiving unit 41. The determining unit 43 also determines whether plural sets of positional information X have been received by the receiving unit 41 from different broadcasting devices 3. In the present embodiment, even when the positional information X is received multiple times from the same broadcasting device 3 within a predetermined period of time, the determining unit 43 determines that only one set of positional information X is received.

The measuring unit 44 is implemented mainly by operations of the CPU 401 illustrated in FIG. 7. When it is determined that plural sets of positional information X are received from different broadcasting devices 3, the measuring unit 44 measures the signal strength of the plural sets of positional information X.

The communication unit 47 is implemented mainly by operations of the CPU 401, the I/F 408, and the bus line 409 illustrated in FIG. 7, and communicates data (or signals) with the radio communication control unit 50.

The storing and reading unit 48 is implemented by operations of the CPU 401, and stores and reads data in and from the storage unit 49. For example, the storing and reading unit 48 stores and reads the positional information X in and from the storage unit 49.

The radio communication control unit 50 may include a storage unit 59 implemented by the RAM 503 illustrated in FIG. 5. The storage unit 59 stores the terminal identification information A. The radio communication control unit 50 may also include a transceiver unit 51, a determining unit 53, a measuring unit 54, a communication unit 57, and a storing and reading unit 58.

The transceiver unit 51 is implemented mainly by operations of the CPU 501 and the communication circuit 504 illustrated in FIG. 7, and sends and receives data to and from the broadcasting device 3 via wireless communications.

The determining unit 53 is implemented mainly by operations of the CPU 501 illustrated in FIG. 7 and determines whether at least one set of device identification information B has been received by the receiving unit 51. The determining unit 53 also determines whether plural sets of device identification information B have been received by the receiving unit 51 from different broadcasting devices 3. In the present embodiment, even when the device identification information B is received multiple times from the same broadcasting device 3 within a predetermined period of time, the determining unit 53 determines that only one set of device identification information B is received.

The measuring unit 54 is implemented mainly by operations of the CPU 501 illustrated in FIG. 7. When it is determined that plural sets of device identification information B are received from different broadcasting devices 3, the measuring unit 54 measures the signal strength of the plural sets of device identification information B.

The communication unit 57 is implemented mainly by operations of the CPU 501, the I/F 508, and the bus line 509 illustrated in FIG. 7, and communicates data (or signals) with the reception control unit 40.

The storing and reading unit 58 is implemented mainly by operations of the CPU 501, and stores and reads data in and from the storage unit 59. For example, the storing and reading unit 58 stores and reads the device identification information A and the device identification information B in and from the storage unit 59.

Next, an exemplary functional configuration of the managed object 4g (or 4h) implemented as a cell phone (or a personal computer) is described with reference to FIG. 15.

Figure 12:
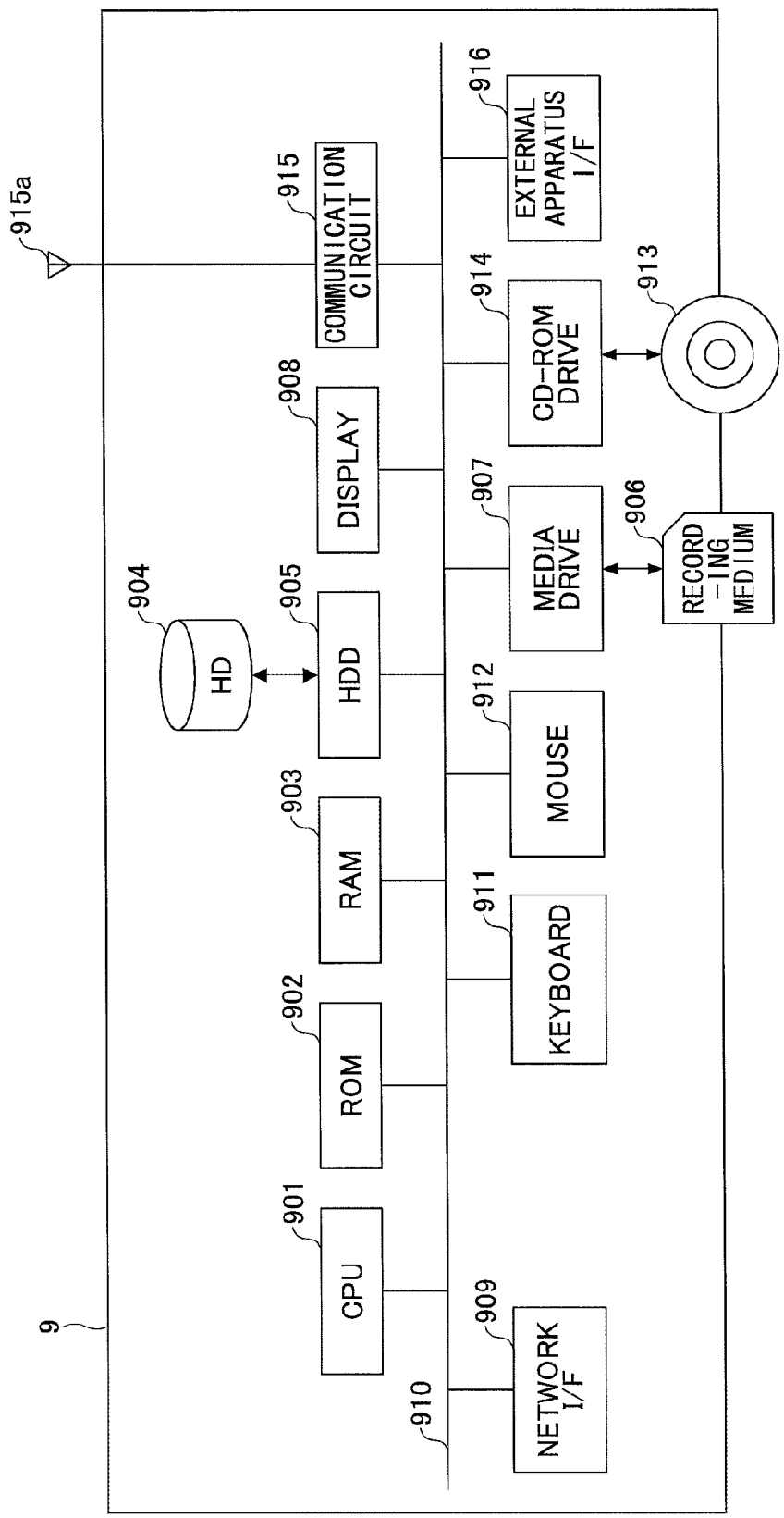
FIG. 12 is a block diagram illustrating an exemplary hardware configuration of a positional information management system.
Figure 15:
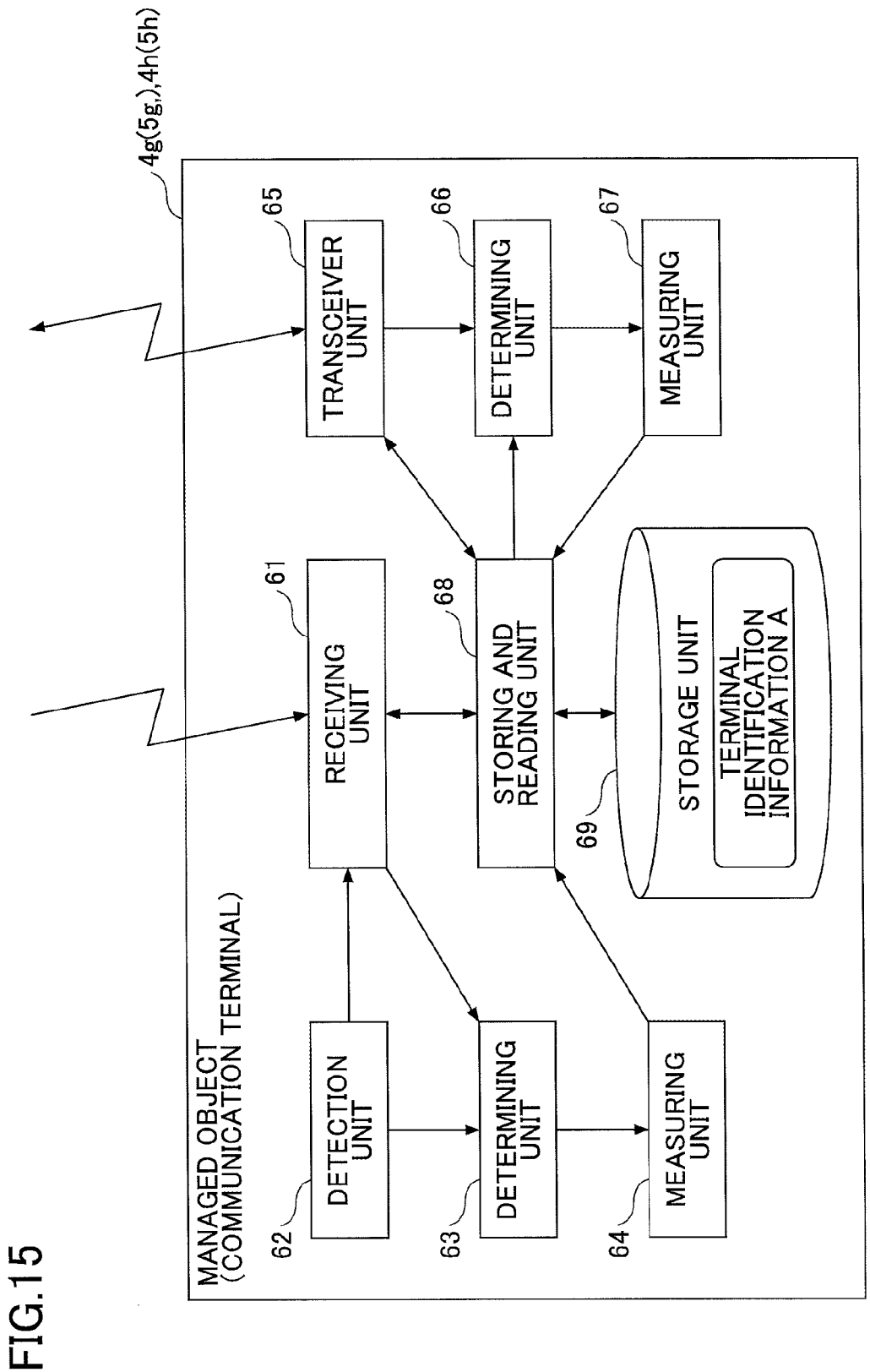
FIG. 15 is a block diagram illustrating an exemplary functional configuration of a managed object implemented as a cell phone or a personal computer.
Figure 16:
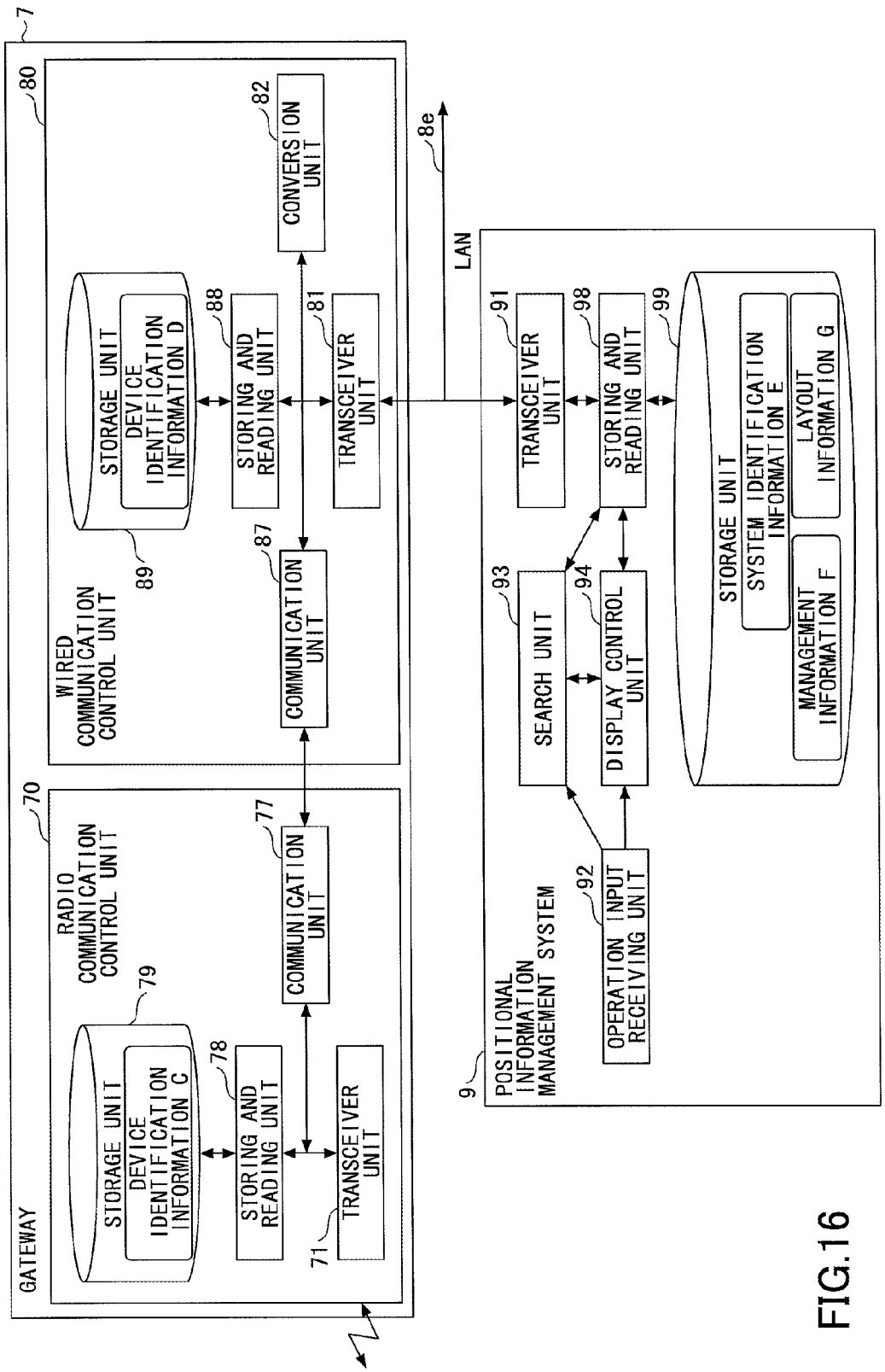
FIG. 16 is a block diagram illustrating exemplary functional configurations of a gateway and a positional information management system.

As illustrated in FIG. 15, the managed object 4g (or 4h) may include a storage unit 69 implemented by the EEPROM 604 illustrated in FIG. 10 or the RAM 903 and the HD 904 illustrated in FIG. 12. The managed object 4g (or 4h) may also include a receiving unit 61, a detection unit 62, a determining unit 63, a measuring unit 64, a transceiver unit 65, a determining unit 66, a measuring unit 67, and a storing and reading unit 68.

The receiving unit 61 is implemented mainly by operations of the CPU 601 and the GPS receiver 614 illustrated in FIG. 10 or operations of the CPU 901 and a GPS antenna connected to the external apparatus I/F 916 illustrated in FIG. 12, and has substantially the same function as the receiving unit 41.

The detection unit 62 is implemented mainly by operations of the CPU 601 and the acceleration and direction sensors 606 illustrated in FIG. 10 or operations of the CPU 901 and an acceleration sensor connected to the external apparatus I/F 916 illustrated in FIG. 12, and has substantially the same function as the detection unit 42.

The determining unit 63 is implemented mainly by operations of the CPU 601 illustrated in FIG. 10 or the CPU 901 illustrated in FIG. 12, and has substantially the same function as the determining unit 43.

The measuring unit 64 is implemented mainly by operations of the CPU 601 illustrated in FIG. 10 or the CPU 901 illustrated in FIG. 12, and has substantially the same function as the measuring unit 44.

The transceiver unit 65 is implemented mainly by operations of the CPU 601 and the communication unit 613 illustrated in FIG. 10 or operations of the CPU 901 and the communication circuit 915 illustrated in FIG. 12, and has substantially the same function as the transceiver unit 51.

The determining unit 66 is implemented mainly by operations of the CPU 601 illustrated in FIG. 10 or the CPU 901 illustrated in FIG. 12, and has substantially the same function as the determining unit 53.

The measuring unit 67 is implemented mainly by operations of the CPU 601 illustrated in FIG. 10 or the CPU 901 illustrated in FIG. 12, and has substantially the same function as the measuring unit 54.

The storing and reading unit 68 is implemented mainly by operations of the CPU 601 illustrated in FIG. 10 or the CPU 901 illustrated in FIG. 12, and has substantially the same function as the storing and reading units 48 and 58.

Next, exemplary functional configurations of the gateway 7 and the positional information management system 9 are described with reference to FIG. 16.

The gateway 7 may include, as functional units, a radio communication control unit 70 and a wired communication control unit 80.

The radio communication control unit 70 is implemented by operations of the radio communication unit 17 illustrated in FIG. 11, and has substantially the same function as the radio communication control unit 30 of the broadcasting device 3.

The radio communication control unit 70 may include a storage unit 79 implemented by the RAM 703 illustrated in FIG. 11. The storage unit 79 stores the device identification information C. The radio communication control unit 70 may also include a transceiver unit 71, a communication unit 77, and a storing and reading unit 78.

The transceiver unit 71 is implemented mainly by operations of the CPU 701 and the communication circuit 704 illustrated in FIG. 11, and sends and receives data to and from the broadcasting device 3 via wireless communications.

The communication unit 77 is implemented mainly by operations of the CPU 701, the I/F 708, and the bus line 709 illustrated in FIG. 11, and communicates data (or signals) with the wired communication control unit 80.

The storing and reading unit 78 is implemented by operations of the CPU 801, and stores and reads data in and from the storage unit 79.

The wired communication control unit 80 is implemented by operations of the wired communication unit 18 illustrated in FIG. 11. The wired communication control unit 80 includes a storage unit 89 implemented by the RAM 803 illustrated in FIG. 11. The storage unit 89 stores the device identification information D. The wired communication control unit may also include a transceiver unit 81, a conversion unit 82, a communication unit 87, and a storing and reading unit 88.

The transceiver unit 81 is implemented mainly by operations of the CPU 801 and the I/F 808b illustrated in FIG. 11, and sends and receives data to and from the positional information management system 9 via wired communications.

The conversion unit 82 is implemented mainly by operations of the CPU 801 and the Ethernet controller 805 illustrated in FIG. 11, and converts data (or information) transmitted from the broadcasting device according to a communication scheme into Ethernet packets for packet communications according to another communication scheme.

The communication unit 87 is implemented mainly by operations of the CPU 801, the I/F 808*a*, and the bus line 809 illustrated in FIG. 11, and communicates data (or signals) with the radio communication control unit 70.

The storing and reading unit 88 is implemented by operations of the CPU 801, and stores and reads data in and from the storage unit 89.

Next, an exemplary functional configuration of the positional information management system 9 is described with reference to FIG. 16.

The positional information management unit 9 may include a storage unit 99 implemented by the RAM 903 and the HD 904 illustrated in FIG. 12. The storage unit 99 stores the system identification information E, the management information F, and the layout information G. The positional information management unit 9 may also include a transceiver unit 91, an operation input receiving unit 92, a search unit 93, a display control unit 94, and a storing and reading unit 98.

The transceiver unit 91 is implemented mainly by operations of the CPU 901, the network I/F 909, and the communication circuit 915 illustrated in FIG. 12, and sends and receives data to and from the gateway 7 via wired and wireless communications. The transceiver unit 91 also sends and receives data to and from the communication terminal 5*h* in the outdoor space γ via the communication network 8.

The operation input receiving unit 92 is implemented mainly by operations of the CPU 901, the keyboard 911, and the mouse 912 illustrated in FIG. 12, and receives selection and input operations preformed by the administrator.

The search unit 93 is implemented mainly by operations of the CPU 901. The search unit 93 searches the management information F in the storage unit 99 via the storing and reading unit 98 based on a search condition received by the operation input receiving unit 92 and outputs search results.

The display control unit 94 is implemented mainly by operations of the CPU 901, and controls the display 908 to display various images and characters.

The storing and reading unit 98 is implemented mainly by operations of the CPU 901, and stores and reads data in and from the storage unit 99.

Operations of the position management system 1 of the present embodiment are described below with reference to FIGS. 17 through 25.

Figure 17:
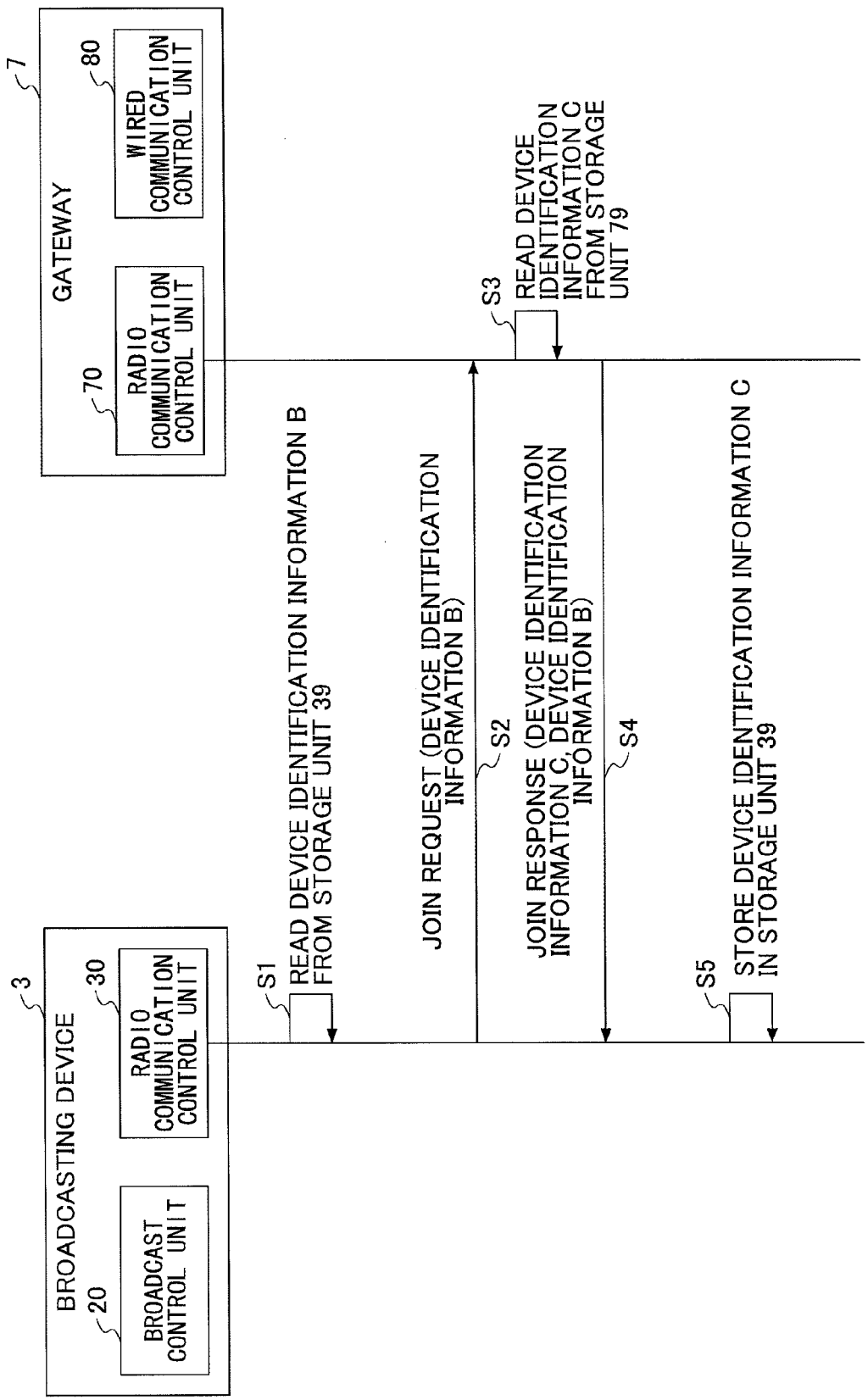
FIG. 17 is a sequence chart illustrating an exemplary process of establishing a communication network at a ceiling.

First, an exemplary process of establishing a communication network at the ceiling β of the indoor space α with reference to a sequence chart of FIG. 17.

When the user turns on the electric apparatuses 2 in the indoor space α, the storing and reading unit 38 (see FIG. 14) of the radio communication control unit 30 of the broadcasting device 3 in each electric apparatus 2 reads the device identification information B from the storage unit 39 (step S1). Then, the transceiver unit 31 transmits a join request including the device identification information B to the gateway 7 (step S2). The transceiver unit 71 of the radio communication control unit 70 of the gateway 7 receives the join request.

Next, the storing and reading unit 78 of the radio communication control unit 70 reads the device identification information C from the storage unit 79 (step S3). Then, the transceiver unit 71 transmits a join response including the device identification information B and the device identification information C to the corresponding broadcasting device 3 (step S4). The transceiver unit 31 of the radio communication control unit 30 of the broadcasting device 3 receives the join response. Since the join response includes the device identification information B transmitted in step S2, the radio communication control unit 30 performs step S4 as a reception process related to step S2. The storing and reading unit 38 stores the device identification information C in the storage unit 39 (step S5). By storing the device identification information C of the gateway 7 at the respective broadcasting devices 3, a communication network is established between the broadcasting devices 3 and the gateway 7.

Figure 18:
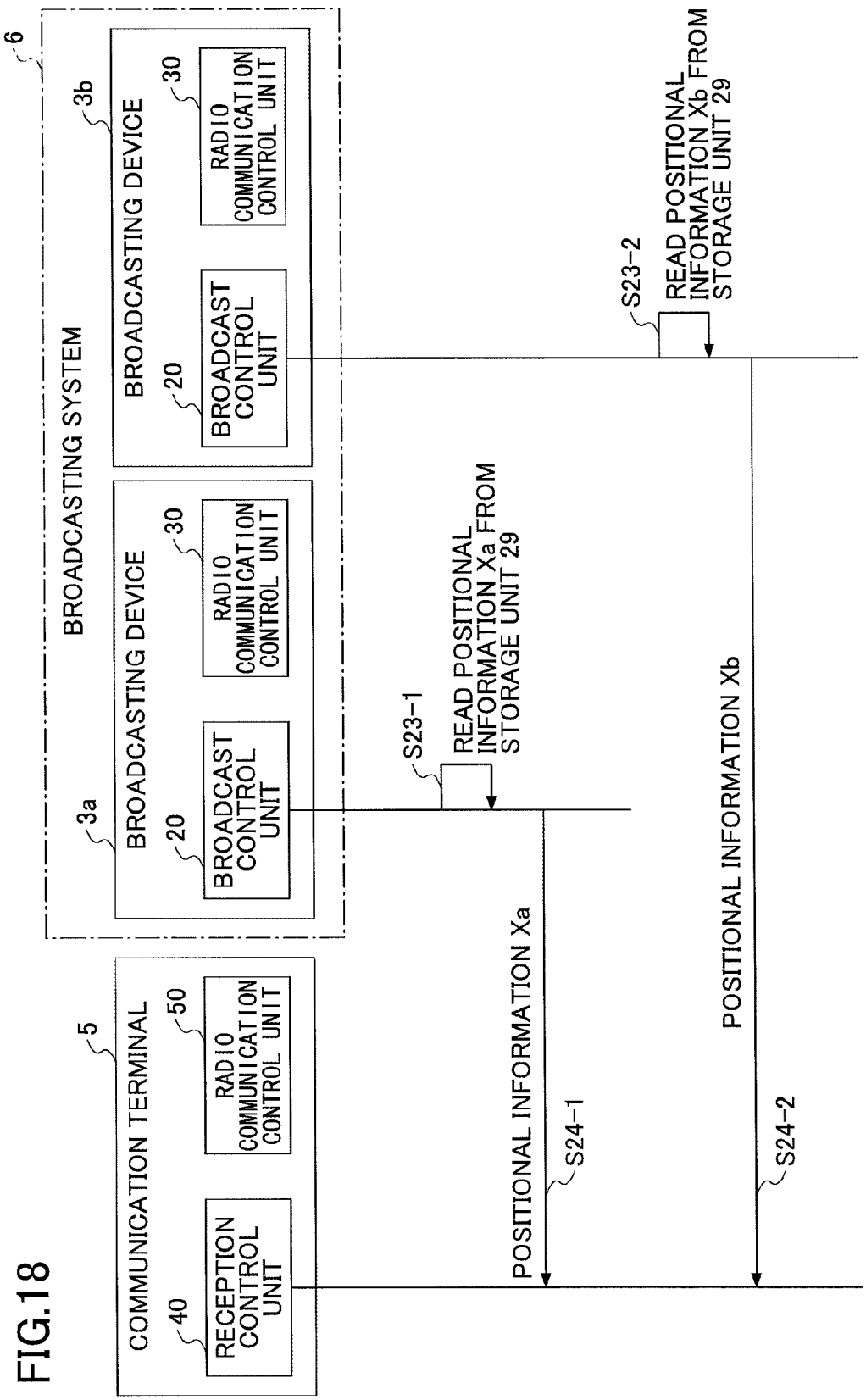
FIG. 18 is a sequence chart illustrating an exemplary process of broadcasting positional information.

Next, an exemplary process of broadcasting positional information from the broadcasting devices 3 on the ceiling β of the indoor space α (see FIG. 1) toward the floor of the indoor space α is described with reference to a sequence chart of FIG. 18. In FIG. 18, for descriptive purposes, a broadcasting system 6 including two broadcasting devices 3*a* and 3*b* is used. Here, it is assumed that the broadcasting device 3*a* broadcasts positional information Xa and the broadcasting device 3*b* broadcasts positional information Xb. Also in FIG. 18, it is assumed that the communication terminal 5 exists within broadcast ranges (where the positional information Xa and the positional information Xb are reachable) of the broadcasting devices 3*a* and 3*b*.

The storing and reading unit 28 of the broadcast control unit 20 of the broadcasting device 3*a* reads the positional information Xa from the storage unit 29 (step S23-1). Next, the broadcasting unit 21 of the broadcast control unit 20 of the broadcasting device 3*a* broadcasts the positional information Xa within its broadcast range (step S24-1). Similarly, the storing and reading unit 28 of the broadcast control unit 20 of the broadcasting device 3*b* reads the positional information Xb from the storage unit 29 (step S23-2). Next, the broadcasting unit 21 of the broadcast control unit 20 of the broadcasting device 3*b* broadcasts the positional information Xb within its broadcast range (step S24-2). Here, even if the positional information Xa and the positional information Xb are broadcast, the communication terminal 5 cannot receive them unless the receiving unit 41 has been activated.

Figure 19:
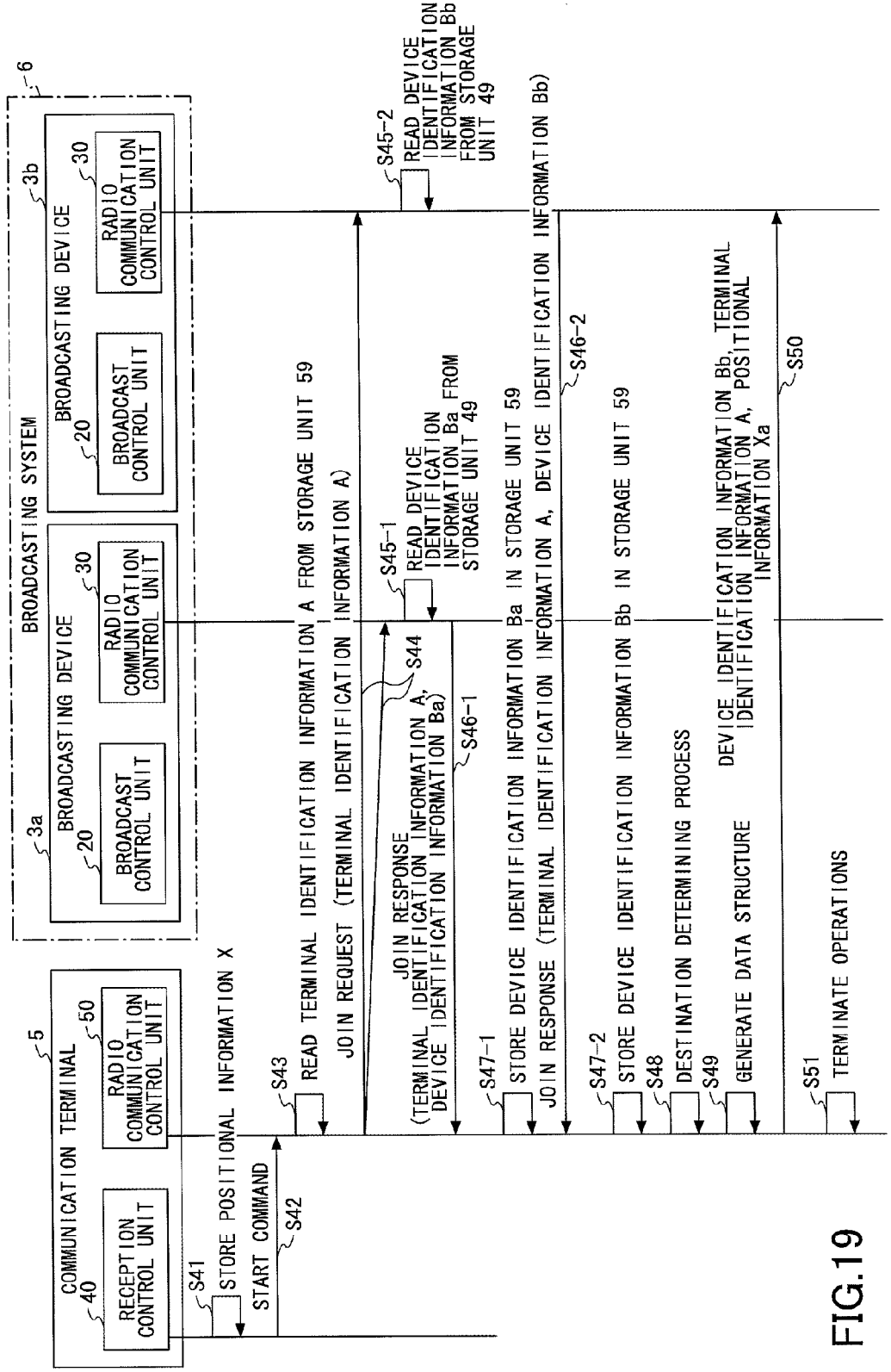
FIG. 19 is a sequence chart illustrating a process of determining positional information to be used by a communication terminal and determining a broadcasting device to which the positional information is to be transmitted.

Next, an exemplary process of determining positional information X to be used by the communication terminal 5 and determining a broadcasting device 3 to which the positional information X is to be transmitted is described with reference to a sequence chart of FIG. 19. In the example of FIG. 19, the communication terminal 5 receives the positional information Xa from the broadcasting device 3*a* and transmits the positional information Xa to the broadcasting device 3*b* instead of the broadcasting device 3*a* that has sent the positional information Xa.

As illustrated in FIG. 19, the storing and reading unit 48 of the reception control unit 40 of the communication terminal 5 stores, in the storage unit 49, one of the positional information Xa broadcast by the broadcasting device 3*a* and the positional information Xb broadcast by the broadcasting device 3 whose received signal strength is higher than the other (step S41). A position indicated by the stored positional information X is managed by the positional information management system 9 as the position of the communication terminal 5.

Figure 20:
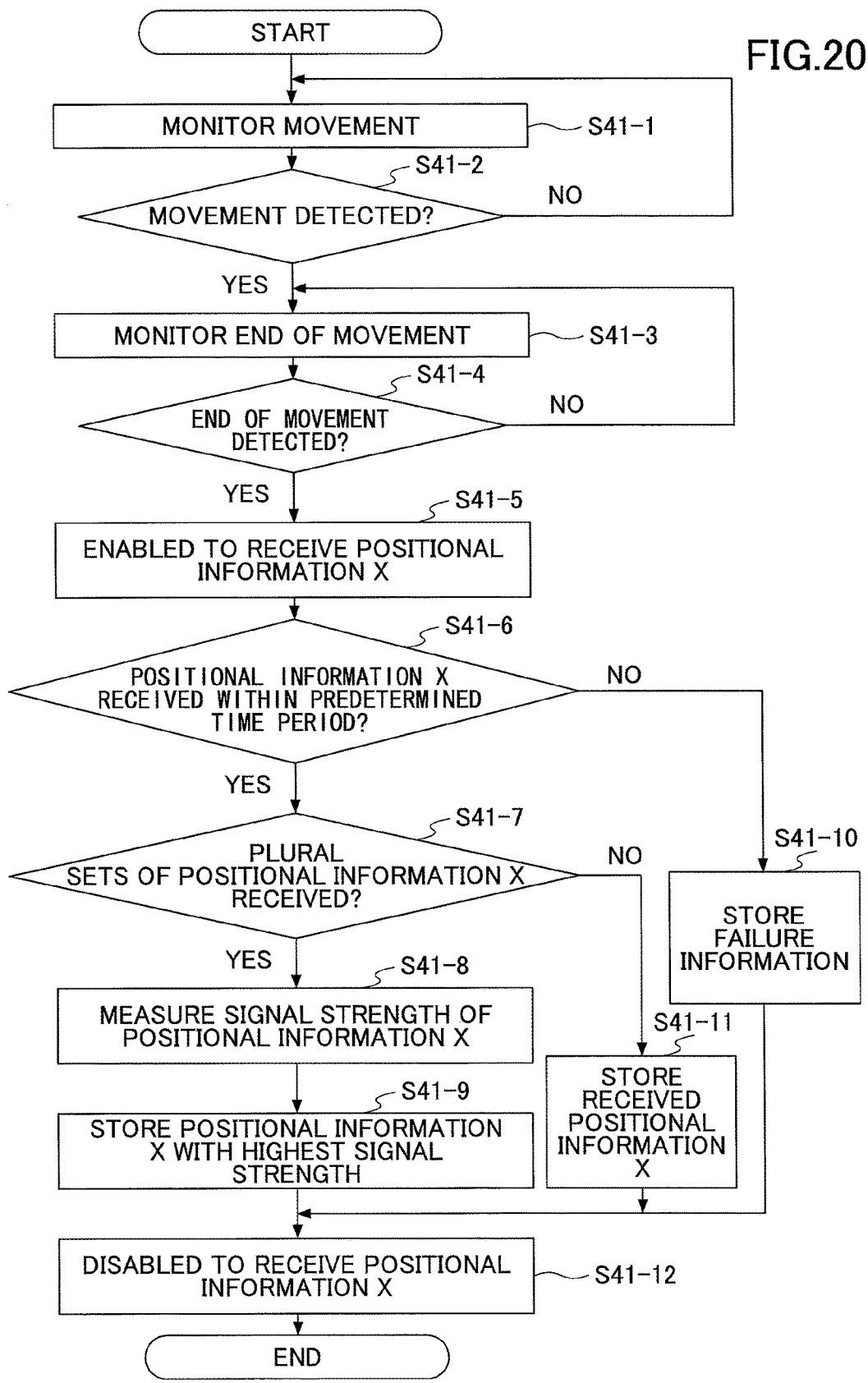
FIG. 20 is a flowchart illustrating a process performed by a communication terminal to receive and store positional information.

Step S41 is described in more detail with reference to FIG. 20. FIG. 20 is a flowchart illustrating an exemplary process performed by the communication terminal 5 to receive and store positional information X.

The detection unit 42 of the reception control unit 40 of the communication terminal 5 continuously monitors the start of movement of the communication terminal 5 (step S41-1, NO at step S41-2). When the start of movement of the communication terminal 5 is detected (YES at step S41-2), the detection unit 42 continuously monitors the end of movement of the communication terminal 5 (step S41-3, NO at step S41-4). More specifically, when a change in acceleration of the communication terminal 5 is detected while the CPU 401 is not in operation, the acceleration sensor 405 sends a signal indicating the start of movement of the communication terminal 5 to the CPU 401 to cause the CPU 401 to start a process. When receiving the signal, the CPU 401 starts a process and continues the process until a signal indicating the end (or stopping) of movement of the communication terminal 5 is received from the acceleration sensor 405. In the present embodiment, the "movement" of the communication terminal 5 includes tilting of the communication terminal 5.

When the end of movement of the communication terminal 5 is detected by the detection unit 42 (YES at step S41-4), the receiving unit 41 is enabled to receive the positional information X being broadcast by the broadcasting device 3 (step S41-5). More specifically, when a signal indicating the end of movement of the communication terminal 5 is received from the acceleration sensor 405, the CPU 401 sends a signal to the communication circuit 404 to cause the communication circuit 404 to start a process. When receiving the signal, the communication circuit 404 starts a process. When the positional information Xa and the positional information Xb are being broadcast from the corresponding broadcasting devices 3a and 3b, the communication circuit 404 of the control unit 14 of the communication terminal 5 starts receiving the positional information Xa and the positional information Xb via the antenna 404a.

Next, the determining unit 43 determines whether at least one set of positional information X has been received within a predetermined period of time (e.g., 5 seconds) from when the receiving unit 41 is enabled to receive positional information X (step S41-6). Here, it is assumed that two sets of positional information X (Xa and Xb) have bee received.

When it is determined that at least one set of positional information X has been received (YES at step S41-6), the determining unit 43 also determines whether plural sets of positional information X have been received (step S41-7).

When it is determined that plural sets of positional information X have been received (YES at step S41-7), the measuring unit 44 measures the signal strength of each set of positional information X received by the receiving unit 41 (step S41-8). Here, it is assumed that the signal strength of the positional information Xa is higher than the signal strength of the positional information Xb.

Next, the storing and reading unit 48 stores, in the storage unit 49, positional information X whose signal strength is the highest among plural sets of received positional information X (step S41-9). In this example, the positional information Xa is stored in the storage unit 49.

Meanwhile, when the determining unit 43 determines that no positional information X has been received (NO at step S41-6), the storing and reading unit 48 stores failure information indicating reception failure in the storage unit 49 (step S41-10).

Also, when the determining unit 43 determines that only one set of positional information X has been received (NO at step S41-7), the storing and reading unit 48 stores the received positional information X in the storage unit 49 (step S41-11).

After steps S41-9, S41-10, or S41-11, the receiving unit 41 stops the process and is disabled to receive positional information X (step S41-12). More specifically, the CPU 401 sends a signal to the communication circuit 404 to cause the communication circuit 404 to stop the process. Thus, according to an embodiment, the positional information X is received only when the communication terminal 5 starts moving and then stops moving. This configuration makes it possible to reduce the frequency of replacing batteries even if a battery with small capacity such as the button battery 406 is used, and thereby makes it possible to save energy.

In the above process, when the start of movement of the communication terminal 5 is detected (YES at step S41-2) and then the end of movement of the communication terminal 5 is detected (YES at step S41-4), the receiving unit 41 is enabled to receive the positional information X (step S41-5). In other words, detection of both the start and end of movement is used as a trigger to enable the receiving unit 41 to receive the positional information X. However, the trigger is not limited to the detection of both the start and end of movement. For example, the receiving unit 41 may be enabled to receive the positional information X when the start of movement of the communication terminal 5 is detected (YES at step S41-2). In other words, steps S41-3 and S41-4 may be omitted and detection of the start of movement may be used as a trigger to enable the receiving unit 41 to receive the positional information X. As another example, steps S41-1 and S41-2 may be omitted and detection of the end of movement may be used as a trigger to enable the receiving unit 41 to receive the positional information X.

Referring back to FIG. 19, the communication unit 47 of the reception control unit 40 sends a start command to the radio communication control unit 50 to cause the radio communication control unit 50 to start a process (step S42). When receiving the start command, the communication unit 57 of the radio communication control unit 50 starts a process as described below.

The storing and reading unit 58 of the radio communication control unit 50 of the communication terminal 5 reads the terminal identification information A from the storage unit 59 (step S43). Then, the transceiver unit 51 transmits a join request including the terminal identification information A to the broadcasting devices 3a and 3b (step S44). The broadcasting devices 3a and 3b receive the join request from the communication terminal 5.

The storing and reading unit 38 of the radio communication control unit 30 of the broadcasting device 3a reads the device identification information Ba from the storage unit 39 (step S45-1). Then, the transceiver unit 31 of the broadcasting device 3a transmits a join response including the terminal identification information A and the device identification information Ba to the communication terminal 5 (step S46-1). The transceiver unit 51 of the radio communication control unit 50 of the communication terminal 5 receives the join response. Since the join response includes the terminal identification information A transmitted in step S44, the communication terminal 5 performs step S46-1 as a reception process related to step S44. The storing and reading unit 58 of the radio communication control unit 50 of the communication terminal 5 stores the device identification information Ba in the storage unit 59 (step S47-1).

Similarly, the storing and reading unit 38 of the radio communication control unit 30 of the broadcasting device 3*b* reads the device identification information Bb from the storage unit 39 (step S45-2). Then, the transceiver unit 31 of the broadcasting device 3*b* transmits a join response including the terminal identification information A and the device identification information Bb to the communication terminal 5 (step S46-2). The transceiver unit 51 of the radio communication control unit 50 of the communication terminal 5 receives the join response. The storing and reading unit 58 of the radio communication control unit 50 of the communication terminal 5 stores the device identification information Bb in the storage unit 59 (step S47-2).

Figure 21:
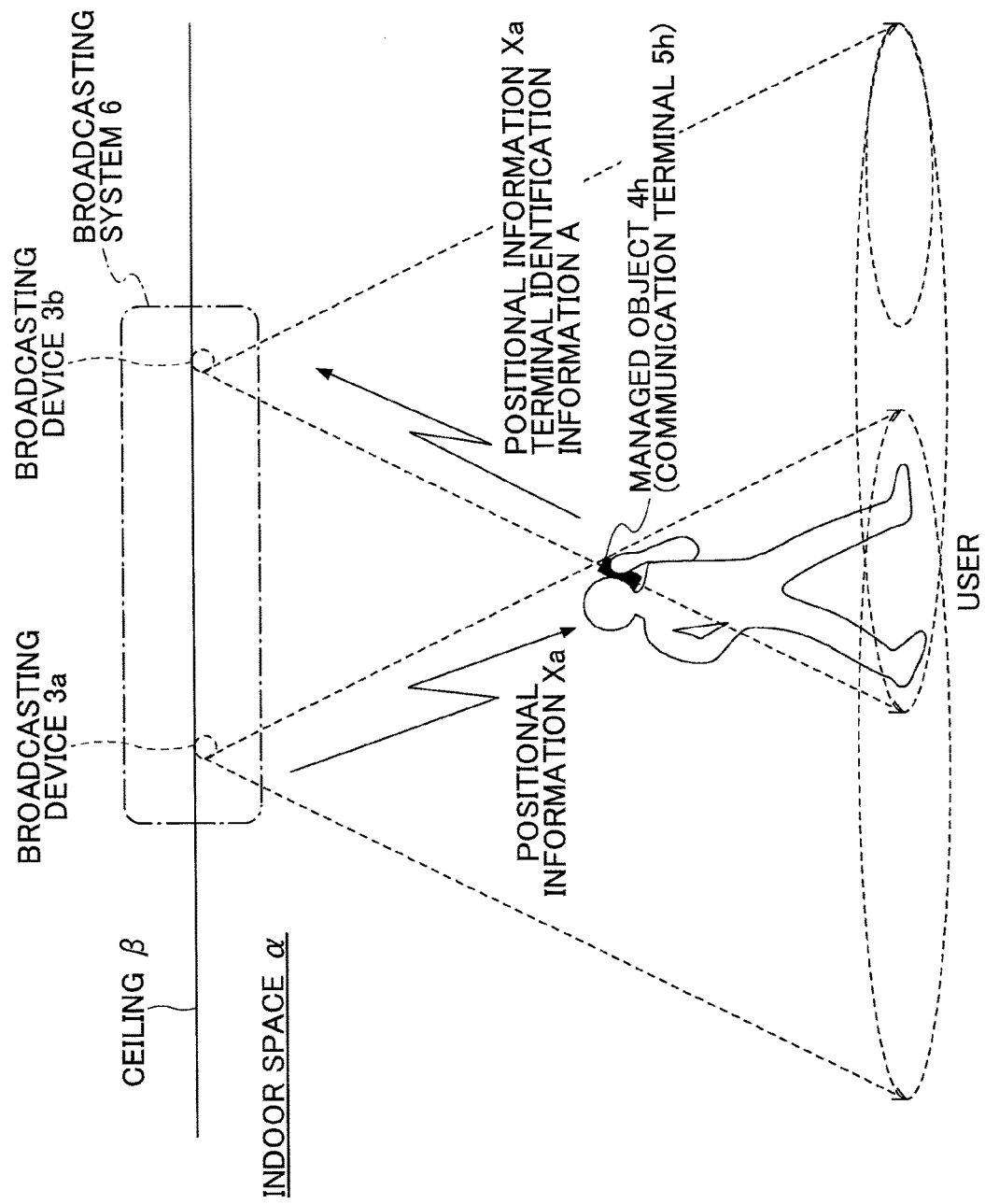
FIG. 21 is a drawing illustrating communications between a broadcasting device and a communication terminal.

Next, the radio communication control unit 50 determines a broadcasting device 3 (3*a* or 3*b*) to which received positional information X (Xa or Xb) and the terminal identification information A are to be transmitted (step S48). Before describing step S48 in detail with reference to FIG. 22, the reason for performing step S48 is described with reference to FIGS. 5, 14, and 21. FIG. 21 is a drawing illustrating communications between the broadcasting devices 3 and the communication terminal 5.

As illustrated in FIG. 14, communications between the broadcast control unit 20 of the broadcasting device 3 and the reception control unit 40 of the communication terminal 5 are performed independently of communications between the radio communication control unit 30 of the broadcasting device 3 and the radio communication control unit 50 of the communication terminal 5. The reception control unit 40 receives the positional information X broadcast by the broadcasting device 3, and in response, the radio communication control unit 50 transmits the terminal identification information A and the positional information X to the broadcasting device 3.

There is a case (case 1) where the indoor space α has a large floor area and a large number of broadcasting devices 3 each including the broadcast control unit 20 and the radio communication control unit 30 need to be installed, and as a result, the installation costs become very high.

There is also a case (case 2) where the broadcasting device 3*a* can broadcast the positional information Xa but cannot receive the terminal identification information A and the positional information Xa from the communication terminal 5 due to malfunction of the radio communication control unit 30.

There is still another case (case 3) where depending on the position of the communication terminal 5 in the indoor space α, the signal strength of the positional information X received from the broadcast control unit 20 of the broadcasting device 3*a* (see step S24-1) is higher than the signal strength of the positional information X received from the broadcast control unit 20 of the broadcasting device 3*b* (see step S24-2) while the signal strength of the join response received from the radio communication control unit 30 of the broadcasting device 3*b* (see step S46-2) is higher than the signal strength of the join response received from the radio communication control unit 30 of the broadcasting device 3*a* (see step S46-1).

Figure 22:
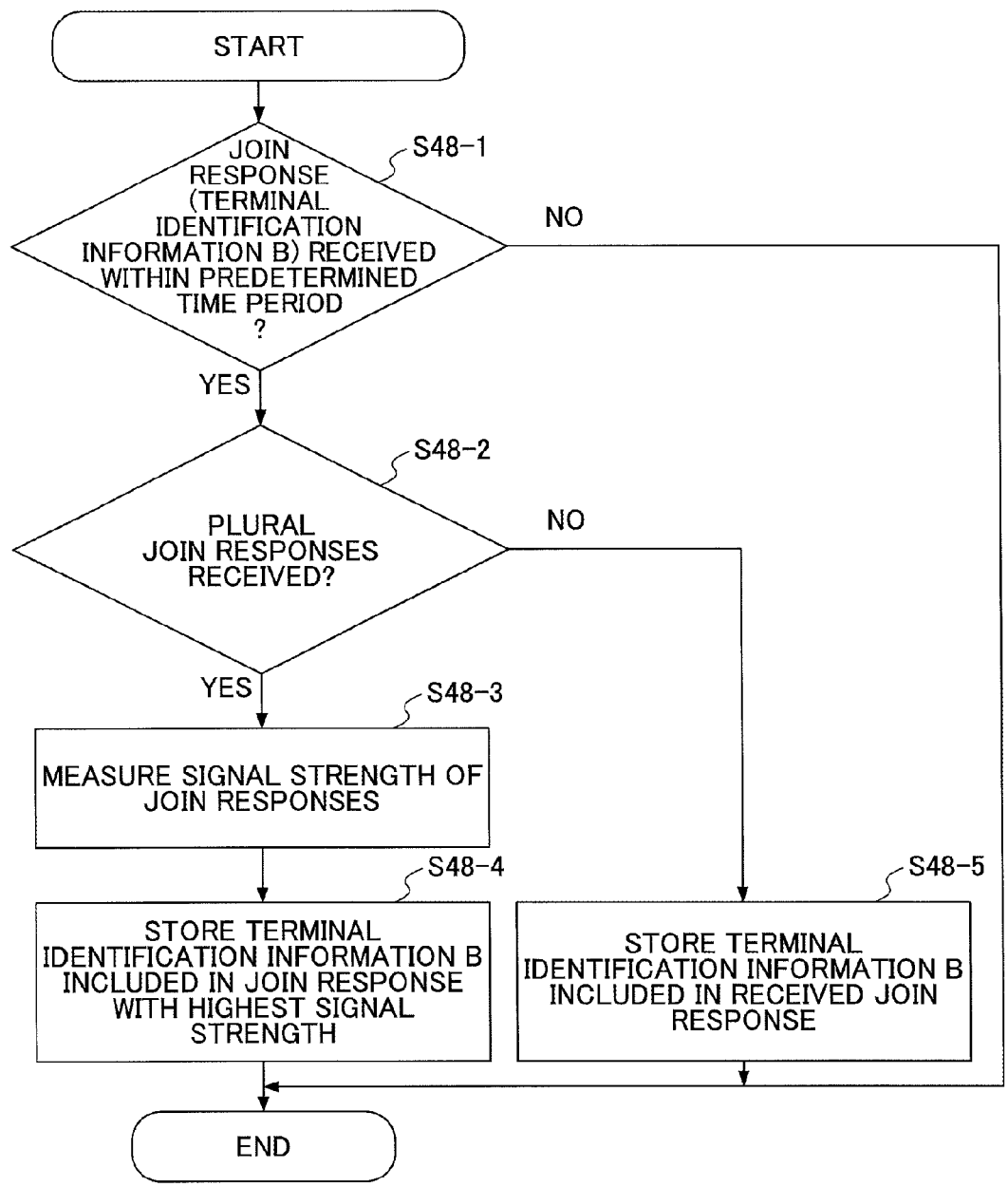
FIG. 22 is a flowchart illustrating an exemplary process of determining a destination.

In cases 1 through 3 described above, as illustrated in FIG. 21, the communication terminal 5*h* receives the positional information Xa from the broadcasting device 3*a*, but transmits the positional information Xa together with its terminal identification information A to the broadcasting device 3*b*. Below, an exemplary case where the sender and the destination are different is described with reference to FIGS. 14 and 20. FIG. 22 is a flowchart illustrating a process of determining a destination.

The determining unit 53 of the radio communication control unit 50 of the communication terminal 5 (see FIG. 14) determines whether at least one join response has been received by the transceiver unit 51 within a predetermined period of time (e.g., 5 seconds) from when the join request is sent in step S44 to the broadcasting devices 3*a* and 3*b* (step S48-1). In other words, the determining unit 53 determines whether at least one set of device identification information B has been received within a predetermined period of time after transmission of the terminal identification information A is started.

When it is determined that at least one join response has been received (YES at step S48-1), the determining unit 53 also determines whether plural join responses have been received (step S48-2). In other words, the determining unit 53 determines whether plural sets of device identification information B have been received within a predetermined period of time after transmission of the terminal identification information A is started.

When it is determined that plural join responses have been received (YES at step S48-2), the measuring unit 54 measures the signal strength of each of the join responses received by the transceiver unit 51 (step S48-3). Here, it is assumed that join responses have been received from the broadcasting devices 3*a* and 3*b* at steps S46-1 and S46-2 of FIG. 19. Therefore, the measuring unit 54 performs step S48-3.

It is also assumed that the signal strength of the join response received from the broadcasting device 3*b* is higher than the signal strength of the join response received from the broadcasting device 3*a*. As illustrated in FIG. 22, the storing and reading unit 58 stores, in the storage unit 59, device identification information B (in this example, device identification information Bb) included in a join response having the highest signal strength measured in step S48-4.

Meanwhile, when the determining unit 53 determines that no join response has been received within the predetermined period of time (NO at step S48-1), the process of FIG. 22 is terminated. Also, when the determining unit 53 determines that only one join response has been received (NO at step S48-2), the storing and reading unit 58 stores the device identification information B included in the received join response in the storage unit 59 (step S48-5).

Through the above described process, the broadcasting device 5 indicated by the device identification information B stored by the storing and reading unit 58 is determined as the destination to which the positional information X and the terminal identification information A are transmitted.

After step S48-4 or S48-5, the transceiver 51 generates a data structure including information as illustrated in FIG. 9 which is to be transmitted to the destination determined at step S48 (step S49). In this exemplary process, the data structure includes the device identification information B of the broadcasting device 3*b* determined as the destination, the terminal identification information Ah of the communication terminal 5*h* that is the sender, and data (the positional information Xa broadcast by the broadcasting device 3*a*) that are arranged in this order.

Next, the transceiver unit 51 transmits the data structure generated at step S49 to the broadcasting device 3*b* (step S50). The radio communication control unit 30 of the broadcasting device 3*b* receives the data structure transmitted by the communication terminal 5*h*.

Then, at the communication terminal 5*h*, operations (or processes) of the transceiver unit 51, the determining unit 53, the measuring unit 54, the communication unit 57, and the storing and reading unit 58 of the radio communication control unit 50 are stopped (step S51). Thus, according to the present embodiment, operations (or processes) of the components of the radio communication control unit 50 are stopped after the transceiver 51 completes transmission of the data structure including the positional information X to the broadcasting device 3. This configuration makes it possible to reduce the power consumption of the communication terminal 5. The components of the radio communication control unit 50 are started again when a new start command is received from the reception control unit 40 at step S42.

Next, an exemplary process where information (data structure) including the positional information X is received by the broadcasting device 3 and then managed by the positional information management system 9 as the management information F is described with reference to a sequence chart of FIG. 23.

Figure 23:
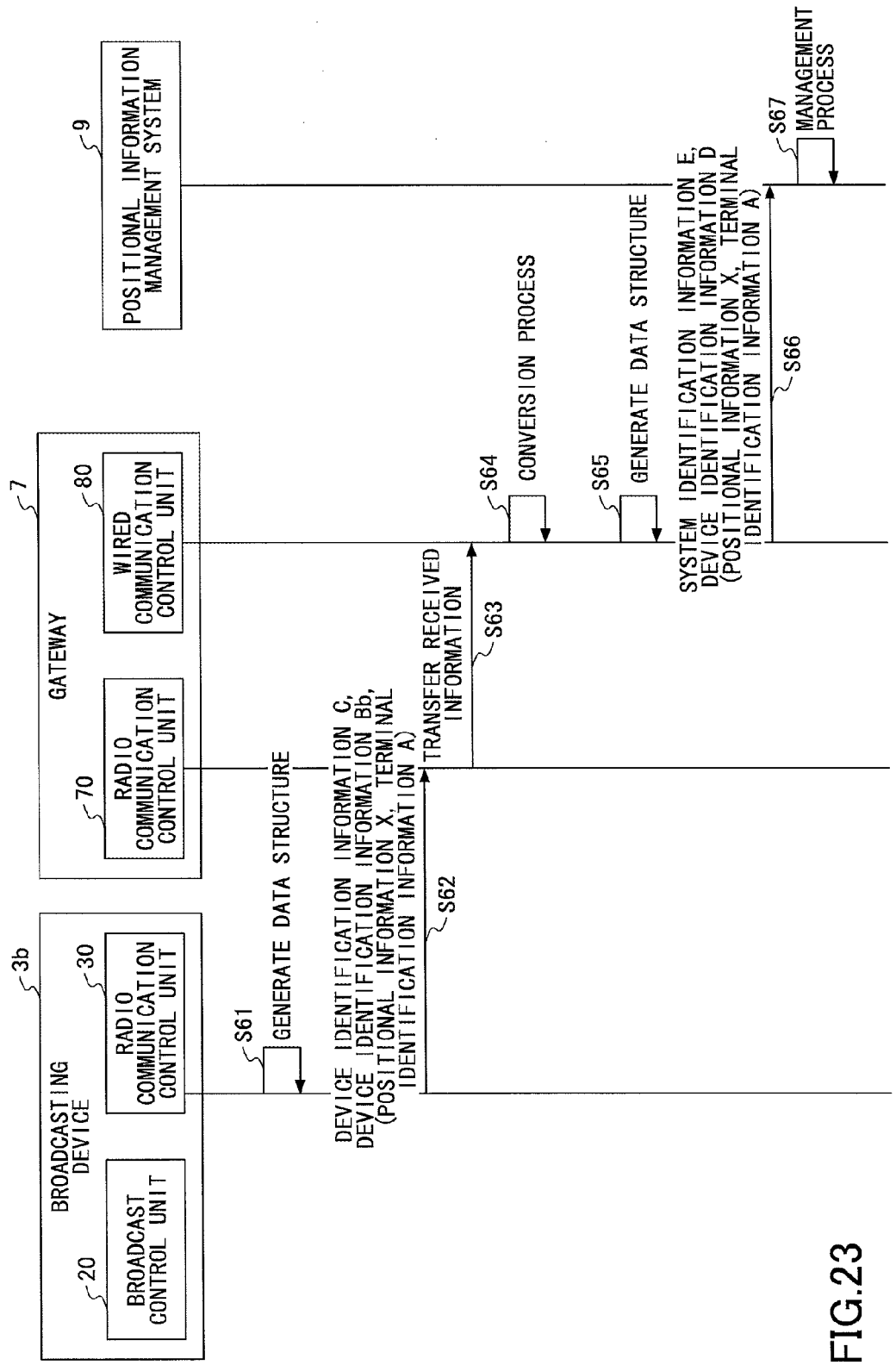
FIG. 23 is a sequence chart illustrating an exemplary process of managing positional information.

As illustrated in FIG. 23, the radio communication control unit 30 of the broadcasting device 3b generates a data structure including information to be transmitted to the gateway 7 in a manner similar to step S49 (step S61). In this exemplary process, the data structure includes the device identification information C of the gateway 7 as the destination, the device identification information Bb of the broadcasting device 3b as the sender, and data (the positional information Xa broadcast by the broadcasting device 3a and the terminal identification information A of the communication terminal 5 that has transmitted the positional information Xa to the broadcasting device 3b) that are arranged in this order.

Next, the transceiver unit 31 of the radio communication control unit 30 of the broadcasting device 3b transmits the data structure generated at step S61 to the gateway 7 (step S62). The transceiver 71 of the radio communication control unit 70 of the gateway 7 receives the data structure transmitted by the broadcasting device 3b.

Next, the communication unit 77 of the radio communication control unit 70 transfers the data structure received at step S62 to the communication unit 87 of the wired communication control unit 80 of the gateway 7 (step S63). The wired communication control unit 80 receives the data structure transferred from the radio communication control unit 70.

Next, the conversion unit 82 of the wired communication control unit 80 converts the information in the data structure transmitted from the broadcasting device 3b according to a communication scheme (communication protocol) conforming to IEEE 802.15.4 into Ethernet packets for packet communications according to a communication scheme (communication protocol) conforming to IEEE 802.3 (step S64). The transceiver unit 81 of the wired communication control unit 80 generates a data structure including information to be transmitted to the positional information management system 9 in a manner similar to step S61 (step S65). In this exemplary process, the data structure includes the system identification information E of the positional information management system 9 as the destination, the device identification information D of the gateway 7 as the sender, and data (the positional information Xa broadcast by the broadcasting device 3a and the terminal identification information A of the communication terminal 5 that has transmitted the positional information Xa to the broadcasting device 3b) that are arranged in this order.

Next, the transceiver unit 81 of the wired communication control unit 80 of the gateway 7 transmits the data structure generated at step S65 to the positional information management system 9 (step S66). The transceiver unit 91 of the positional information management system 9 receives the data structure transmitted by the gateway 7.

Next, the storing and reading unit 98 of the positional information management system 9 adds the positional information Xa included in the received data structure and received date and time of the positional information Xa to a record including the corresponding terminal identification information A already stored in the storage unit 99 (step S67). In other words, the storing and reading unit 98 stores the positional information Xa in the management information F as illustrated in FIG. 13 and thereby manages positional information.

With the management information F being managed by the positional information management system 9, the administrator of the positional information management system 9 can perform searches as described below with reference to FIGS. 24 and 25. FIGS. 24 and 25 are drawings illustrating exemplary screens displayed by the positional information management system 9.

For example, when the administrator inputs an instruction by operating the keyboard 911 and/or the mouse 912 illustrated in FIG. 12, the operation input receiving unit 92 receives the instruction and the display control unit 94 reads the management information F via the storing and reading unit 98 and displays a search screen as illustrated by FIG. 24 on the display 908. The search screen includes a search list displaying apparatus names in association with owner names (or administrator names). A check box is displayed to the right of each apparatus name. Also a "Search" button for executing a search is displayed below the lower-right corner of the search list. In the search screen of FIG. 24, it is assumed that the position of an apparatus "UCS P3000" owned by "First Sales Section" is searched for.

When the administrator selects a check box associated with the apparatus name of an apparatus (managed object 4) by operating the keyboard 911 or the mouse 912 to find its position, the operation input receiving unit 92 receives information indicating the selected check box. When the administrator clicks on the "Search" button after selecting check boxes associated with apparatus names of all apparatuses the administrator desires to know their positions, the operation input receiving unit 92 receives a search command, and the search unit 93 searches the management information F stored in the storage unit 99 based on the apparatus names corresponding to the selected check boxes. The search unit 93 extracts parts of the management information F including the positional information X corresponding to the apparatus names and parts of the layout information G illustrating floors including positions indicated by the extracted positional information X.

Then, the display control unit 94 displays a search result screen as illustrated by FIG. 25 on the display 908 based on the extracted management information F and layout information G. In the example of FIG. 25, the search result screen includes a layout image of "4th floor of Building A" where the apparatus "UCS P3000" is located, and the positional information X and the received date and time corresponding to the apparatus "UCS P3000". With the search result screen, the administrator can visually identify the position of the managed object 4 (communication terminal 5).

According to an embodiment of the present invention, the broadcasting device 3 includes not only the broadcasting unit 21 but also the transceiver 31. With this configuration, the communication terminal 5 located within a broadcast range where the positional information X broadcast by the broadcasting device 3 is reachable only needs to transmit the positional information X and the terminal identification information A to the broadcasting device 3 within the broadcast range. This in turn makes it possible to minimize the power consumption of the communication terminal 5 for transmission. Thus, embodiments of the present invention make it possible to provide a broadcasting device that can reduce the power consumption of a communication terminal.

Also according to an embodiment of the present invention, the positional information X is received only when the communication terminal 5 starts moving and then stops moving. This configuration makes it possible to reduce consumption of battery power of the communication terminal 5. Further, operations (or processes) of the components of the radio communication control unit 50 are stopped after the transceiver 51 completes transmission of a data structure including the positional information X to the broadcasting device 3. This configuration also makes it possible to reduce the power consumption of the communication terminal 5. This in turn makes it possible to reduce the frequency of replacing batteries even if a battery with small capacity such as the button battery 406 is used, and thereby makes it possible to save time of the user.

Also according to an embodiment, the broadcasting device 3b can receive the positional information Xa and the terminal identification information A from the communication terminal 5 in place of the broadcasting device 3a. This configuration makes it possible to reduce the installation costs of the broadcasting devices 3 (refer to case 1 described above). This configuration also makes it possible to obtain the positional information Xa and the terminal identification information A by the broadcasting system 6 even when the radio communication unit 30 of the broadcasting device 3a has failed (refer to case 2 described above). Further, according to an embodiment of the present invention, the communication terminal 5 may be configured to transmit the positional information X and the terminal identification information A to a broadcasting device 3 that can communicate with the communication terminal 5 with higher signal strength than the other broadcasting devices 3 in the broadcasting system 6 (refer to case 3 described above). This configuration enables the broadcasting system 6 to more reliably receive the positional information X and the terminal identification information A from the communication terminal 5.

The positional information management system 9 may be implemented by a single computer, or the functional units of the positional information management system 9 may be assigned to plural computers.

Programs for implementing the functional units of the above described apparatuses (e.g., the broadcasting device 3, the communication terminal 5, the gateway 7, and the positional information management system 9) may be stored in a storage medium such as a CD-ROM or a hard disk, and such a storage medium may be supplied as a program product to domestic and foreign markets.

The determining unit 43, 63 is an example of a first determining unit and the determining unit 53, 66 is an example of a second determining unit. The first determining unit and the second determining unit may be provided as a single functional unit or may be provided as separate functional units. The measuring unit 44, 64 is an example of a first measuring unit and the measuring unit 54, 67 is an example of a second measuring unit. The first measuring unit and the second measuring unit may be provided as a single functional unit or may be provided as separate functional units.

According to an aspect of this disclosure, a broadcasting device includes not only a broadcasting unit but also a receiving unit. With this configuration, a communication terminal located within a broadcast range where positional information broadcast by the broadcasting device is reachable can transmit the positional information and its terminal identification information to the broadcasting device within the broadcast range. This configuration makes it possible to provide a broadcasting device that can reduce the power consumption of a communication terminal.

A broadcasting device, a position management system, a broadcasting method, and a storage medium storing a program for causing a computer to perform the broadcasting method are described above as preferred embodiments. However, the present invention is not limited to the specifically disclosed embodiments, and variations and modifications may be made without departing from the scope of the present invention.

As mentioned above, the communication terminal 5 according to an embodiment of the present invention may receive positional information X transmitted from the broadcasting device 3. In the above-mentioned example, the positional information X is used so that the positional information management system keeps track of the position of the communication terminal 5. The positional information X may be used by a routing assistance application (i.e. a navigation application) when the communication terminal 5 is implemented as a cell phone. The navigation application has a function to display, on a map, the current position of the communication terminal 5 or a route from the current position to a destination.

Generally, the communication terminal 5 may not obtain the current position information in an indoor space with GPS. Thus the communication terminal 5 may estimate the current position using differential positioning. Differential positioning is a technology to estimate the current position by use of information obtained by an acceleration sensor and/or an earth magnetism sensor which are incorporated in the communication terminal 5.

Relative positional information obtained by the differential positioning may include errors. Thus, the positional information may be modified with the positional information X broadcast by the IMES transmitter. However, since a radio signal from the IMES transmitter is transmitted to a predetermined area, the positional information transmitted by IMES may have a margin of error depending on the position of the communication terminal.

In order to solve the problem, the broadcasting device 3 according to an embodiment illustrated below transmits the positional information X as well as information indicative of whether the positional information may be used for the navigation application. The communication terminal 5 which has received this information refers to the information and determines whether the positional information X which has been received together may be used as the positional information indicating the current position of the communication terminal 5. The above-noted information is referred to as "reachable range information S", and indicates a size of a reachable range (coverage) of the signal transmitted by the broadcasting device 3. For example, the size of the reachable range is expressed by the diameter of a circle whose center is directly below the broadcasting device 3 installed on the ceiling or the like. For example, the size of the reachable range may be "small" when the diameter is around 3 meters, and the size may be "large" when the diameter is around 10 meters. The size of the reachable range may be configurable depending on the degree of precision required by the navigation application. The broadcasting device 3, the communication terminal 5 and the positional information management system which use the reachable range information S will be explained below. The following explanation will be given with reference to an example in which these devices have the same hardware configurations as those illustrated in FIGS. 5, 10 and 12. However, this is not a limiting example, and the devices may have additional parts or may have fewer parts.

<Overview of Reachable Range Information>

Figure 26:
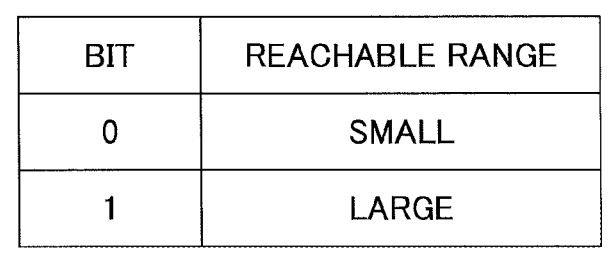

FIG. 26 illustrates an exemplary expression of the size of the reachable range information S. The size of the reachable range information S included in the signal transmitted by the broadcasting device 3 may be expresses as:

(1) "Large" (i.e. the navigation application may not use the positional information because the positional information transmitted does not precisely indicate the position at the communication terminal); or (2) "Small" (i.e. the navigation application may use the positional information because the positional information indicates the position of the communication terminal precisely).

In FIG. 26, a single bit is used to express the size of the positional information. FIG. 26 illustrates the size of the reachable range. In FIG. 26, the broadcasting device 3*a* transmits the signal with the reachable range information "Small" (Bit 0), and the broadcasting device 3*b* transmits the reachable range information "Large" (Bit 1). As stated above, the reachable range expressed as "Small" is limited to the range within which the navigation application is able to use the positional information without a problem relating to precision. For example, in a case where a margin of error of the position which the navigation application may accept is about 3 meters, the reachable range may be set to 3 meters for the reachable range information "Small". The transmission power of the signal is pre-configured for the broadcasting device whose reachable range information is set to "Small" in order that the signal is confined within a 3-meter radius under the broadcasting device. The pre-configuration may be done automatically depending on the reachable range information S. On the other hand, the reachable range may be set to 10 meters for the reachable range information "Large", which is larger than "Small" (i.e. 3 meters). The above-mentioned reachable range is a mere example and an actual range may be determined depending on an environment in which the broadcasting device 3 and the communication terminal are used. For example, the reachable range for a shopping mall may be set larger than for a store.

FIG. 26 shows an example of bit assignment for the reachable range information, and other assignments may alternatively be used. In addition, the assignment may be done for indicating not only "Large" and "Small" but also three or more levels.

The reachable range information S is transmitted together with the positional information X by the broadcasting device 3. The communication terminal 5 may receive the IMES signal including a set of the information and determine whether the positional information X may be used to determine the current position.

Figure 28:
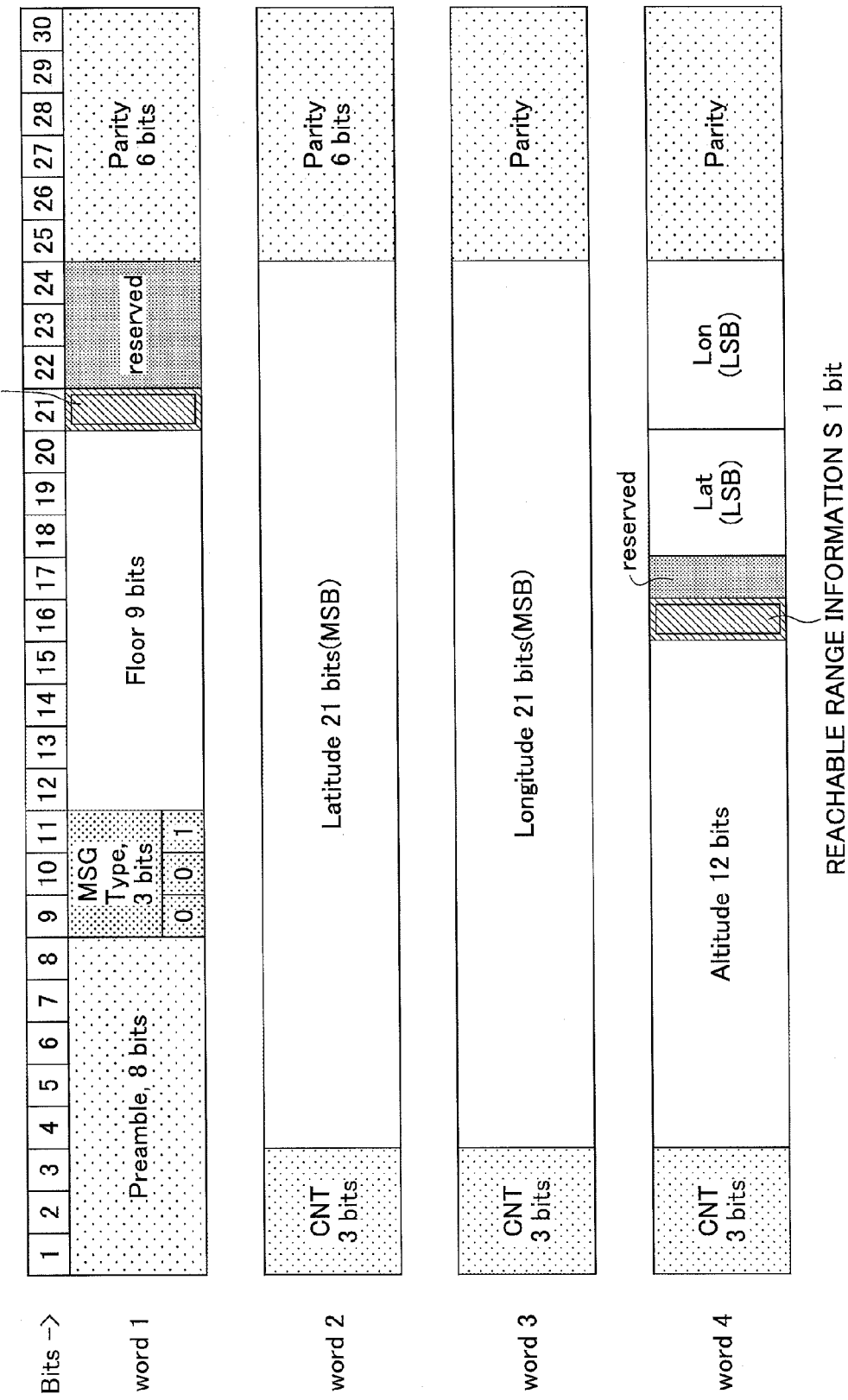
FIG. 28 is a drawing illustrating an exemplary frame structure transmitted by a broadcasting device.
Figure 29:
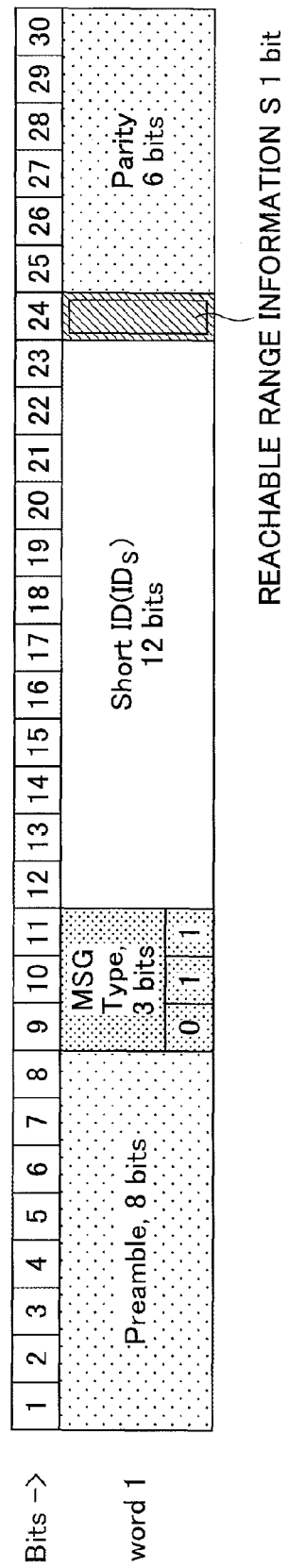
FIG. 29 is a drawing illustrating an exemplary frame structure transmitted by a broadcasting device.
Figure 30:
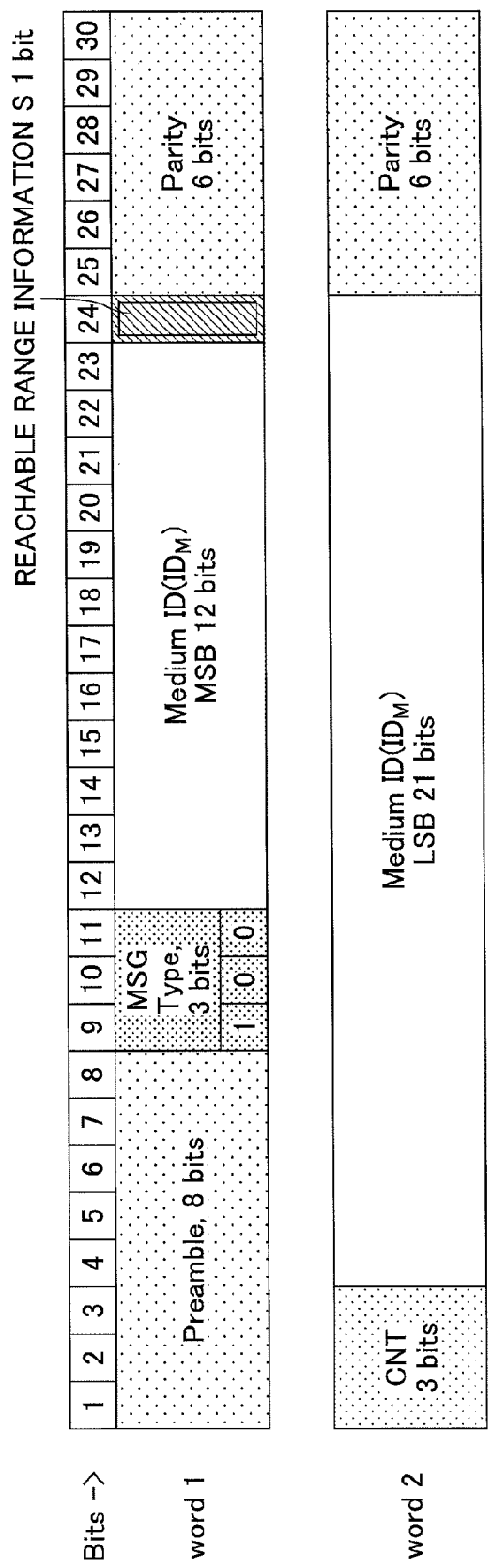
FIG. 30 is a drawing illustrating an exemplary frame structure transmitted by a broadcasting device.

FIGS. 28 through 30 illustrates exemplary frame structures including the reachable range information S expressed as a single bit and the positional information X, which is constructed by the broadcasting device 3 according to the IMES standard. As illustrated in FIG. 37, four types of Message type ID (MID) 0, 1, 3 and 4 are defined, and frame formats are defined based on the MID. In FIG. 28, the frame format for MID 1 is used to store the single bit of the reachable range information S in 6-bit "Reserved" area. In FIG. 29, the frame format for MID 3 is used to store the reachable range information S in "Short ID" area. In FIG. 30, the frame format for MID 4 is used to store the reachable range information S in "Medium ID" area.

In FIGS. 29 and 30 case, the frame formats do not include the positional information within the same frame. Thus the communication terminal which has received the frames needs to refer to the positional information included in a previous or next frame. It is to be noted that the above-stated configuration is a mere example. More bits (e.g. 3 bits to indicate "Large", "Middle" and "Small") may be included in the frame as the transmission range information S.

The reachable range information S transmitted by the broadcasting device 3 together with the positional information X may be controlled by the positional information management system 9. FIG. 27 illustrates "broadcasting device information I" stored by the positional information management system 9. The reachable range information S for the broadcasting device 3 is included in the broadcasting device information I. The positional information control system 9 may transmit the reachable range information S included in the broadcasting device information I to each broadcasting device at the time when the broadcasting device 3 is installed or responding to an instruction from a user after its installation. Alternatively, the user may directly configure the reachable range information S for the broadcasting device 3 with a information processing terminal which may communicate with the broadcasting device. Each broadcasting device may control the transmission power of the signal according to the reachable range information S received from the positional information management system 9.

<Functional Configurations>

Next, exemplary functional configurations of the broadcasting device 3, the communication terminal 5 and the positional information management system 9 are described with reference to FIGS. 31 through 33.

Figure 31:
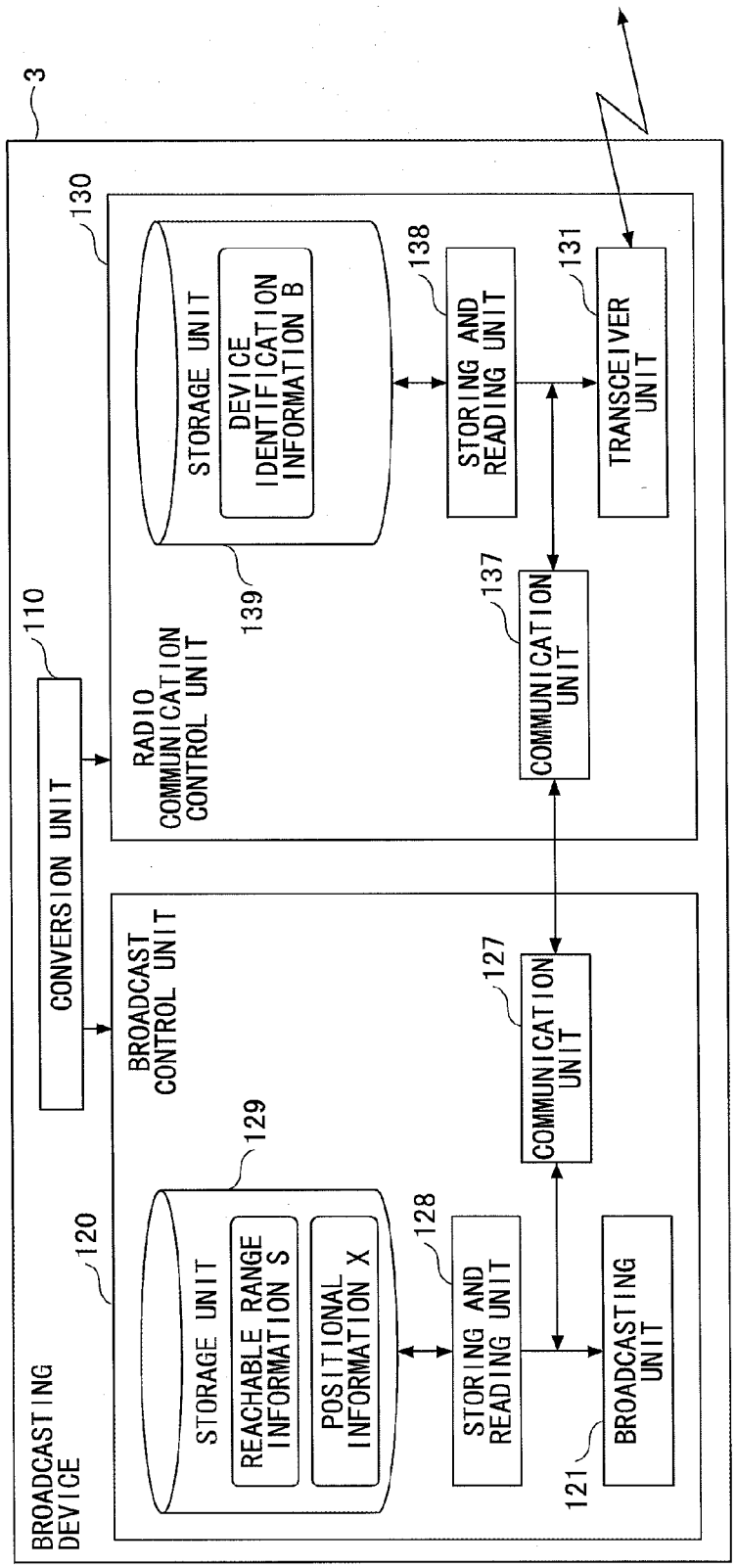
FIG. 31 is a block diagram illustrating an exemplary functional configuration of a broadcasting device.

FIG. 31 illustrates an exemplary functional configuration of the broadcasting device 3. A conversion unit 110, a broadcasting unit 121, a communication unit 127, a storing and reading unit 128, a storage unit 129, a transceiver unit 131, a communication unit 137, a storing and reading unit 138, and a storage unit 139 illustrated in FIG. 31 corresponds to the conversion unit 10, the broadcasting unit 21, the communication unit 27, the storing and reading unit 28, the storage unit 29, the transceiver unit 31, the communication unit 37, the storing and reading unit 38, and the storage unit 39 illustrated in FIG. 14 respectively. In addition, the storage unit 129 stores the reachable range information S.

The broadcasting unit 121 has a function to broadcast the reachable range information S read from the storage unit 129 together with the positional information X.

The transceiver unit 131 has a function to receive the reachable range information S transmitted from the positional information management system 9 via the gateway 7. The reachable range information S is stored in the storage unit 129 of the broadcast control unit 120.

In addition, the transceiver unit 131 may be configured to receive information about determination of a determining unit 171 (described later) regarding the positional information P indicating the current position of the communication terminal 5. The determination may be conveyed to the positional information management system 9.

The above-mentioned function allows the broadcasting device 3 in this embodiment to transmit information indicating whether the positional information X is precise enough or not for the navigation application to the communication terminal 5 located in the reachable range of the signal.

Figure 32:
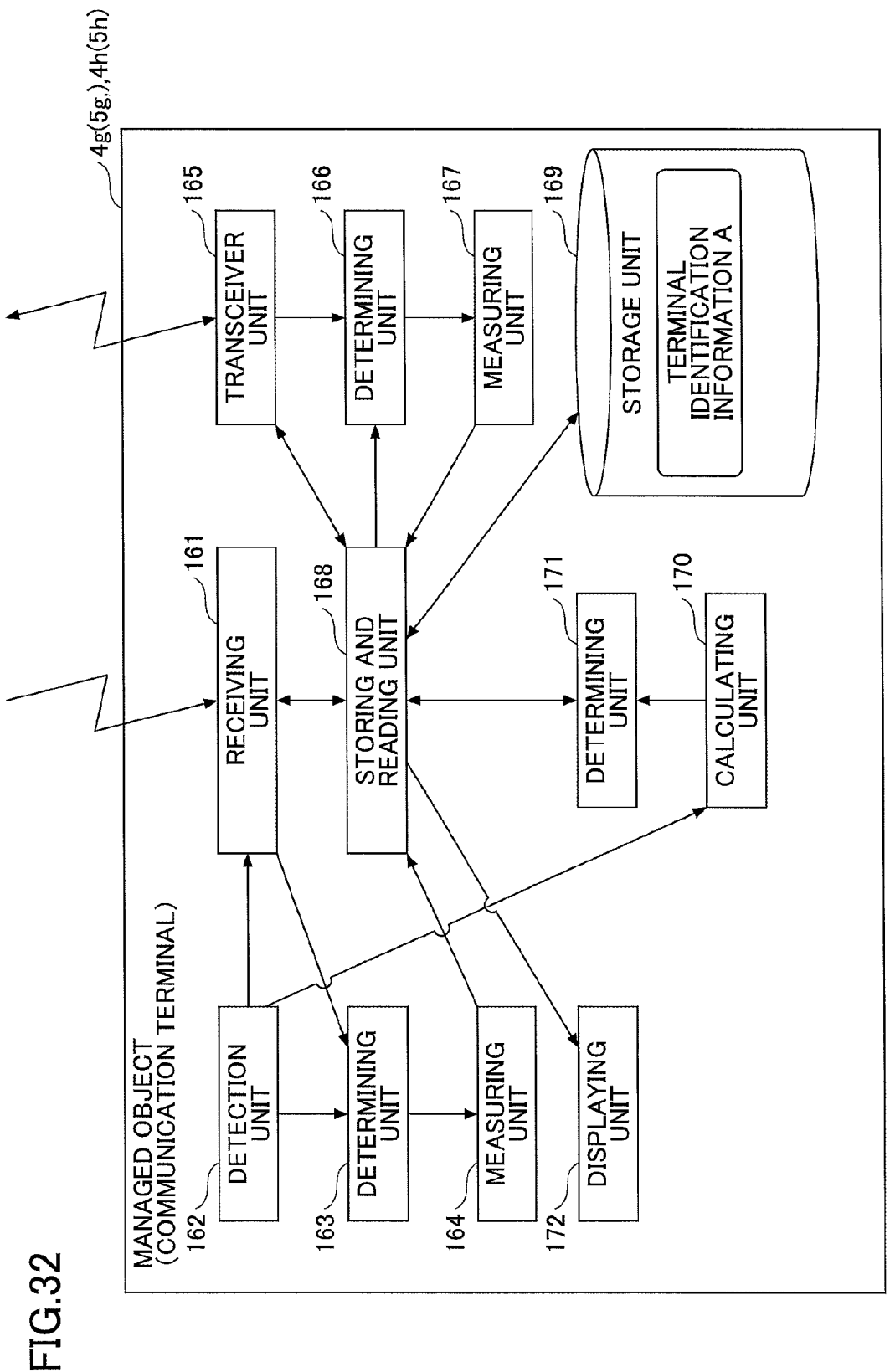
FIG. 32 is a block diagram illustrating an exemplary functional configuration of a communication terminal.

FIG. 32 illustrates an exemplary functional configuration of the communication terminal 5. A receiving unit 161, a detection unit 162, a determining unit 163, a measuring unit 164, a transceiver unit 165, a determining unit 166, a measuring unit 167, a storing and reading unit 168 and a storage unit 169 illustrated in FIG. 32 correspond to the receiving unit 61, the detection unit 62, the determining unit 63, the measuring unit 64, the transceiver unit 65, the determining unit 66, the measuring unit 67, the storing and reading unit 68 and the storage unit 69 illustrated in FIG. 15 respectively. In addition, the communication terminal 5 includes a calculating unit 170, a determining unit 171 and a displaying unit 172.

The receiving unit 161 further has a function to receive the positional information X and the reachable range information S broadcast from the broadcasting device 3. The positional information X and the reachable range information received may be stored in the storage unit 169 either temporarily or permanently.

The detection unit 162 has a function to detect an acceleration rate, an angular rate and/or a direction (inclination) of the communication terminal 5 and transmit the rate and/or direction detected to the calculating unit 170 in addition to the function of the detection unit 62 illustrated in FIG. 15.

The calculating unit 170 is implemented by either operations of the CPU 601 illustrated in FIG. 10. and/or operations of the CPU 901 illustrated in FIG. 12. The calculating unit 170 estimates the current position of the communication terminal 5 based on information about the acceleration rate, the angular rate and/or the direction received from the detection unit 162. The calculating unit 170 calculates the current position based on the positional information of the communication terminal 5 previously obtained, a time lag between the time when the positional information was previously obtained and the current time, the velocity (or an acceleration rate) detected for the time lag and/or the direction of the communication terminal 5, etc. (i.e. differential positioning). The calculation may be performed with any PDR technology. The relative positional information R calculated by the calculating unit 170 with the differential positioning is passed to the determining unit 171.

The determining unit 171 is implemented by operations of the CPU 601 illustrated in FIG. 10. The determining unit 171 determines which positional information of either the positional information X obtained via the receiving unit 61 or the relative positional information R calculated by the calculating unit 170 indicates the current position of the communication terminal more precisely. The determining unit 171 refers to the reachable range information S received together with the positional information X by the receiving unit 161 in order to perform the determination. When the reachable range information S indicates "Small (i.e. the size of the reachable range of the signal is small)", the determining unit 171 considers the positional information X as the current position information P which indicates the current position of the communication device 5. When the reachable range information S indicates "Large (i.e. the size of the reachable range of the signal is large)", the determining unit 171 considers the relative positional information R as the current position information P which indicates the current position of the communication device 5. The current position information P indicating the current position of the communication terminal 5 is stored in the storage unit 169.

The displaying unit 172 is implemented by operations of the CPU 601 and the display 615 illustrated in FIG. 10. The displaying unit 172 may display a screen showing the position indicated by the current position information P with a map.

The above-mentioned function allows the communication terminal 5 to determine which positional information of either the positional information transmitted by the broadcasting device 3 or the positional information calculated with the differential positioning may be used based on the reachable range information S transmitted by the broadcasting device 3. As a result, the navigation application may choose precise positional information from positional information included in the signal for indoor positioning.

Figure 33:
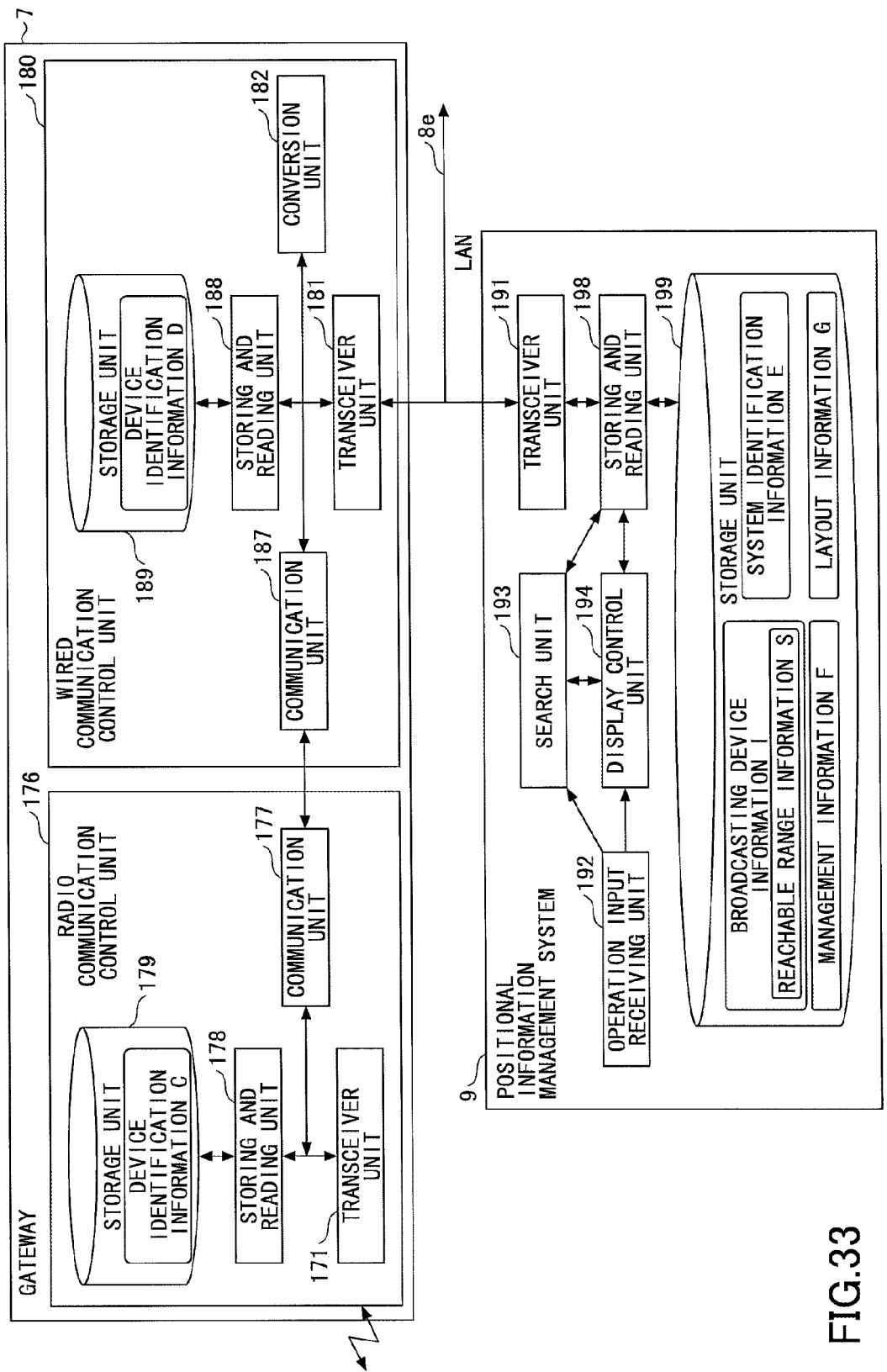
FIG. 33 is a block diagram illustrating an exemplary functional configuration of a positional information management system.

FIG. 33 illustrates exemplary functional configurations of the gateway 7 and the positional information management system 9. Each of elements of the gateway 7 illustrated in FIG. 33 corresponds to the element with the same name illustrated in FIG. 16. A transceiver unit 191, an operation input receiving unit 192, a search unit 193, a display control unit 194, a storing and reading unit 198, and a storage unit 199 illustrated in FIG. 33 correspond to the transceiver unit 91, the operation input receiving unit 92, the search unit 93, the display control unit 94, the storing and reading unit 98, and the storage unit 99 illustrated in FIG. 16 respectively. The storage unit 99 further stores the broadcasting device information I.

In addition to the function of the transceiver unit 91, the transceiver unit 191 further has a function to transmit the reachable range information S to each of the broadcasting devices 3 via the gateway 7. The reachable range information S may be transmitted at the time when the broadcasting device 3 is installed or responding to an instruction from the user after its installation.

The above-mentioned function allows the positional information management system 9 in this embodiment to maintain the reachable range information S which the broadcasting device 3 transmits and update the information as needed.

<Flowchart>

Figure 34:
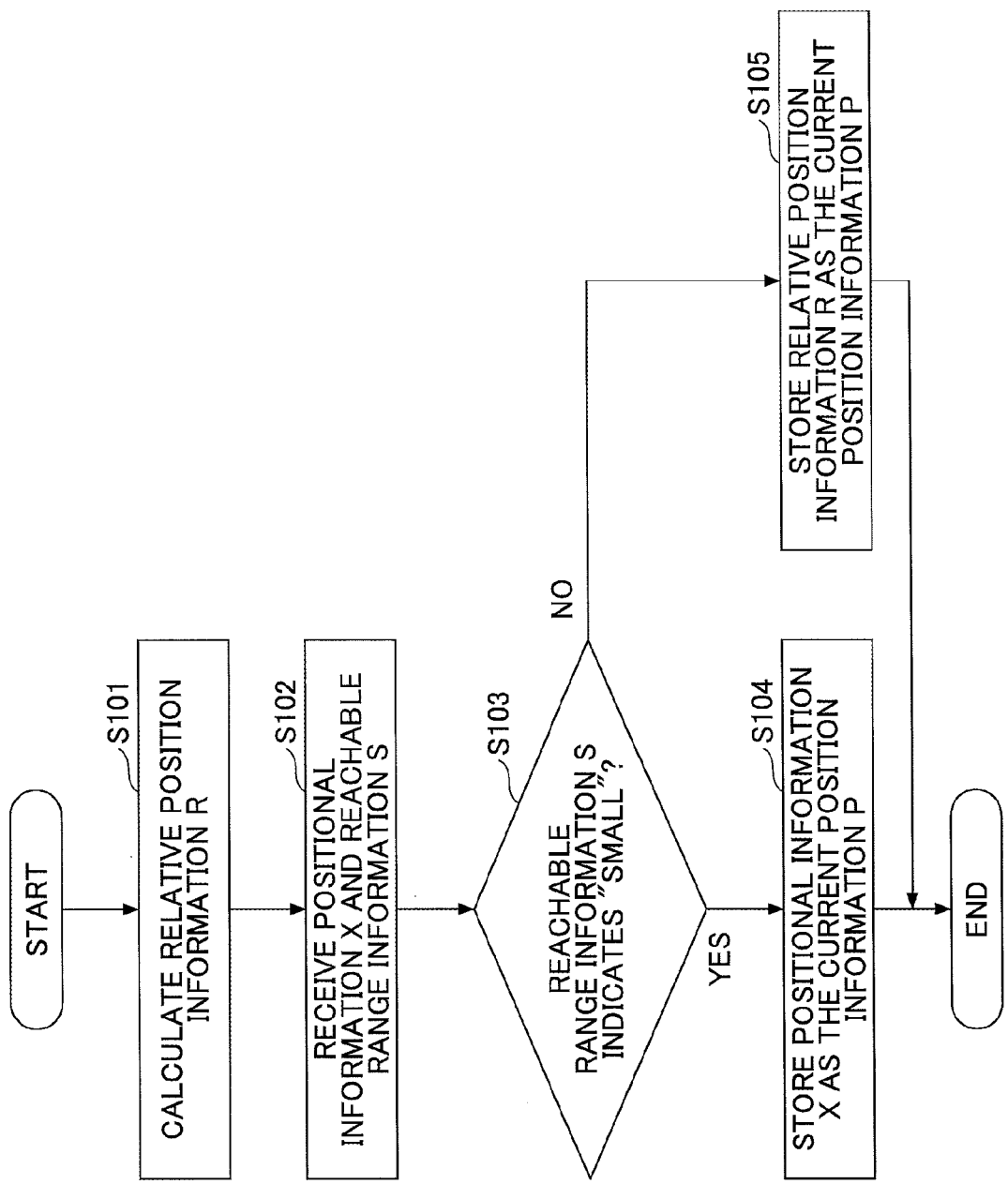
FIG. 34 is a flowchart illustrating an exemplary process of determining the current positional information performed by a communication device.

Next, an operation of the communication terminal 5 in an embodiment to determine the current position is described with reference to FIG. 34.

The calculating unit 170 calculates the relative positional information R of the communication terminal 5 depending on a movement of the communication terminal 5 (or a user) detected by the detection unit 162 (Step S101). Any known differential positioning technique may be used for the calculation. Next, the receiving unit 161 receives the positional information X and the reachable range information S broadcast from the broadcasting device 3 (Step S102). The determining unit 171 refers to the reachable range information S, and when the reachable range information S indicates "Small" (Step S103, YES), the determining unit 171 stores the positional information X received at S102 in the storage unit 169 as the positional information P indicating the current position of the communication terminal (Step S104). Otherwise (Step S103, NO) the determining unit 171 stores the relative positional information R calculated at S101 in the storage unit 169 as the current position information P indicating the current position of the communication terminal (Step S105).

Finally, the displaying unit 172 may display a map indicating the current position using the current position information P. Periodical execution of the operation allows the communication terminal to modify the current position calculated using the differential positioning by replacing the relative position information R with the highly reliable positional information obtained by IMES. For example, an indoor navigation application for pedestrians usually using the differential positioning may employ highly reliable positional information obtained by IMES to modify the current position of the communication terminal.

In the above-mentioned example, the communication device receives the positional information X from a single broadcasting device. However, the communication device may receive the positional information from two or more broadcasting devices and use the information obtained with the strongest signal.

Figure 35:
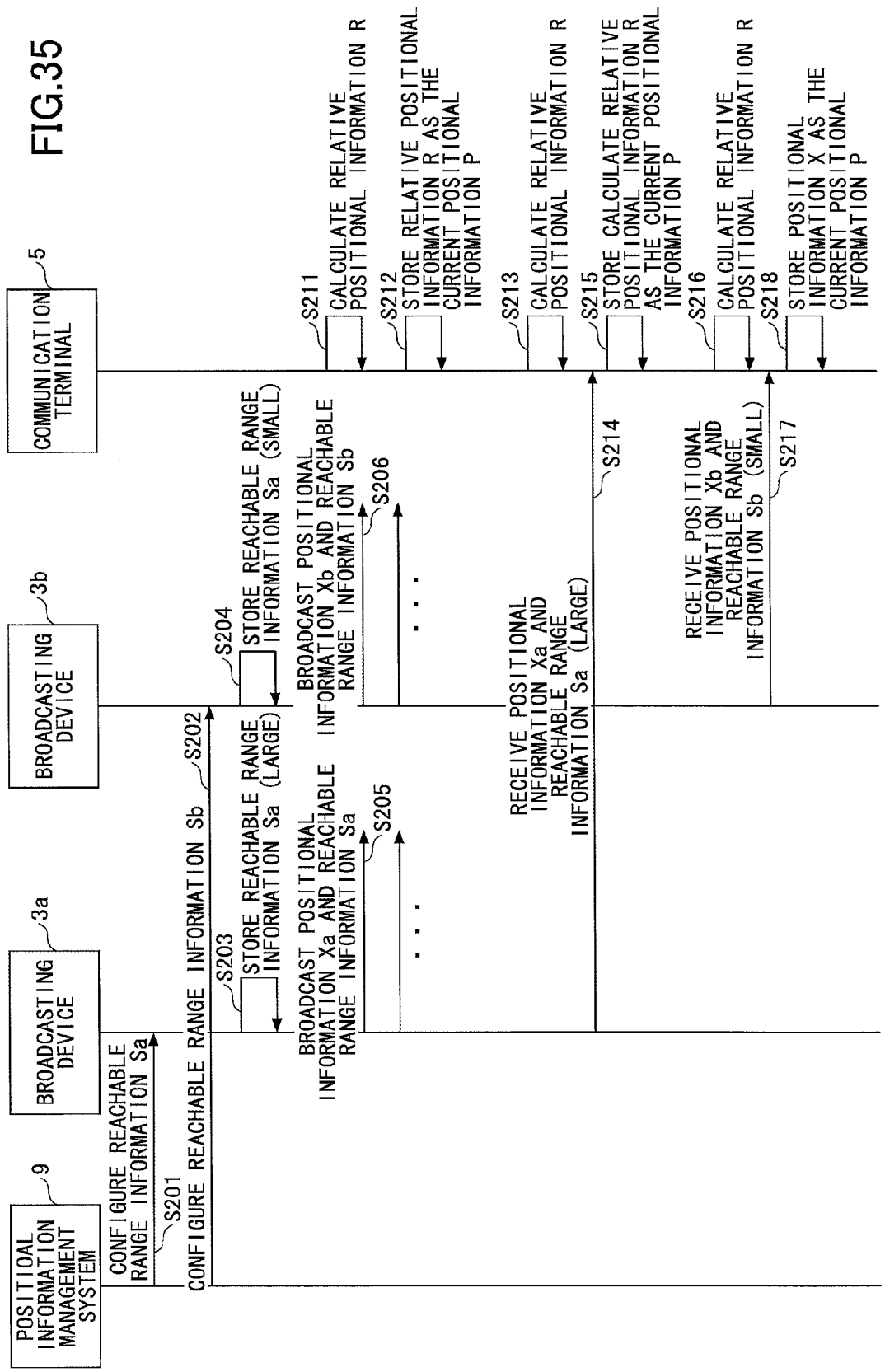
FIG. 35 is a drawing illustrating an exemplary process performed by a positional information management system, a broadcasting device and a communication terminal.
Figure 36:
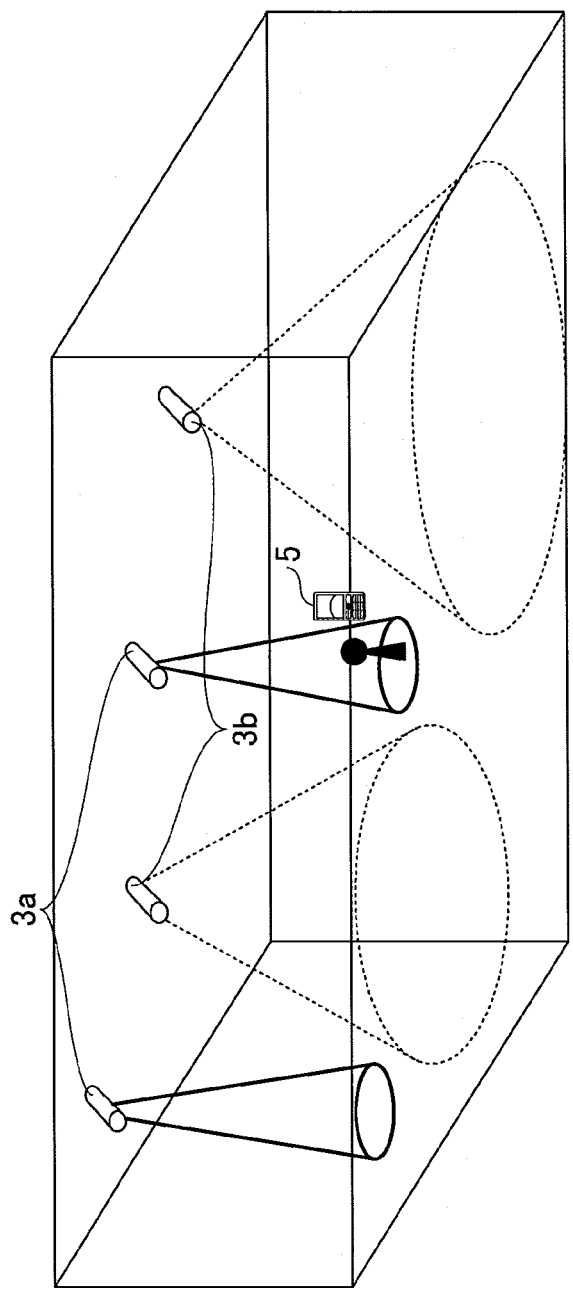
FIG. 36 is a drawing illustrating the size of reachable range.

Next, a sequence of the communication terminal 5, broadcasting terminals 3a, 3b, and the positional information management system 9 to determine the current position after the reachable range information S is set to the broadcasting device is described with reference to FIG. 35. Two broadcasting devices 3a, 3b are exemplary described in this example. The broadcasting device 3a has the reachable range information "Large" (Sa) and the broadcasting device 3b has the reachable range information "Small" (Sb).

The transceiver unit 191 transmits the reachable range information Sa, Sb, which is pre-determined in the broadcasting device information I illustrated in FIG. 27, to the broadcasting devices 3a, 3b via the gateway 7 (Steps S201, S202). Each of the transceiver units 131 of the broadcasting devices 3a, 3b receiving the reachable range information Sa, Sb store the reachable range information Sa, Sb in the storage unit 129 (Steps S203, S204). Each of the broadcasting devices 3a, 3b broadcasts the signal including the positional information Xa, Xb and the reachable range information Sa, Sb to a predetermined area respectively.

The calculating unit 170 of the communication terminal 170 calculates the relative positional information R of the communication terminal 5 based on a movement of the user of the communication terminal 5, which is detected by the detection unit 162 (Step S211). At this step, the communication device 5 has not received the signal from any broadcasting devices. The communication device 5 thus stores the relative positional information calculated at S211 in the storage unit 169 as the current position information P indicating the current position of the communication terminal 5.

Next, the user having the communication terminal 5 moves, and the calculating unit 170 of the communication terminal 5 calculates the relative positional information R along with the S211 (S213). Here, the receiving unit 161 of the communication terminal receives the positional information Xa and the reachable range information Sa (indicating "Large") broadcast by the broadcasting unit 121 of the broadcasting device 3a (Step S214). The determining unit 171 of the communication device 5 stores the relative positional information calculated at S213 in the storage unit 169 as the current position information P indicating the current position of the communication device 5 (Step S215).

Next, the user having the communication terminal 5 further moves, and the calculating unit 170 of the communication terminal 5 calculates the relative positional information R along with the S211 and S213 (Step S216). Here, the receiving unit 161 of the communication terminal receives the positional information Xb and the reachable range information Sb (indicating "Small") broadcast by the broadcasting unit 121 of the broadcasting device 3b (Step S217). The determining unit 171 of the communication device 5 stores the positional information X received at S217 in the storage unit 169 as the current position information P indicating the current position of the communication device 5 (Step S218).

The communication device according to this embodiment may choose positional information broadcast by the broadcasting device 3, which meets requirements for precision of an application working on the communication terminal 5. In particular, when the communication device 5 uses both differential positioning technology such as PDR and positioning technology for an indoor environment such as IMES, the communication device 5 may use the positional information obtained by the indoor positioning instead of the relative positional information calculated by the differential positioning as needed. As a result, precision of positioning for the communication device 5 is advantageously enhanced.

What is claimed is:

1. A broadcasting device, comprising:
   a memory having computer readable instructions stored thereon; and
   at least one processor configured to execute the computer readable instructions to,
   broadcast positional information indicating an indoor position of the broadcasting device to a desired area, and
   broadcasts range information indicating the size of the desired area together with the positional information,
   the size of the desired area is either a first size or a second size, the second size being smaller than the first size, and
   the range information indicating the second size causes a communication terminal receiving the range information to determine that the positional information indicates the current position of the communication terminal.

2. The broadcasting device as claimed in claim 1, wherein the range information indicating the first size causes the communication terminal receiving the range information to determine that the positional information calculated by the communication terminal with differential positioning indicates the current position of the communication terminal.

3. The broadcasting device as claimed in claim 1, wherein the positional information and the size of the desired area are stored in a frame conforming to an indoor messaging system standard and broadcast.

4. The broadcasting device as claimed in claim 1, wherein the range information is configured by an external system via a network.

5. The broadcasting device as claimed in claim 4, wherein the network conforms to at least a physical layer of an IEEE 802.15.4 standard.

6. The broadcasting device as claimed in claim 4, wherein the external system is configured to track the positions of a plurality of communication terminals.

7. A communication terminal, comprising:
   a memory having computer readable instructions stored thereon; and
   at least one processor configured to execute the computer readable instructions to,
   receive positional information indicating an indoor position of a broadcasting device and range information indicating the size of a desired area to which the positional information is broadcast; and
   determine whether the positional information indicates the current position of the communication terminal or not using the range information.

8. A broadcasting system, comprising:
at least one broadcasting device configured to
a broadcasting unit configured to broadcast positional information indicating an indoor position of the broadcasting device to a desired area, and
broadcasts range information indicating the size of the desired area together with the positional information; and
at least one communication terminal configured to
receive the positional information and the range informational, and
determine whether the positional information indicates the current position of the communication terminal or not by using the range information.

9. The communication terminal as claimed in claim 7, further comprising:
an acceleration sensor configured to detect a change in acceleration; and
wherein the at least one processor is further configured to receive positional information when the acceleration sensor detects the change in acceleration.

10. The communication terminal as claimed in claim 7, wherein the communication terminal is installed on a managed object.

11. The communication terminal as claimed in claim 7, wherein the at least one processor is further configured to:
detect a plurality of positional information from a plurality of broadcasting devices;
based on results of the detecting the plurality of positional information, determine signal strength of the plurality of positional information; and
store the positional information associated with the strongest determined signal strength as the positional information of the communication terminal.

12. The communication terminal as claimed in claim 7, wherein
the size of the desired area is either a first size or a second size, the second size being smaller than the first size; and
the at least one processor is further configured to determine that the positional information indicates the current position of the communication terminal when the range information indicates the second size.

13. The communication terminal as claimed in claim 12, wherein
the at least one processor is further configured to determine that the positional information calculated by the communication terminal with differential positioning indicates the current position of the communication terminal when the range information indicates the first size.

14. The communication terminal as claimed in claim 7, wherein
the positional information and the size of the desired area are stored in a frame conforming to an indoor messaging system standard and broadcast.

15. The communication terminal as claimed in claim 7, wherein the range information is configured by an external system via a network.

16. The communication terminal as claimed in claim 15, wherein the network conforms to at least a physical layer of an IEEE 802.15.4 standard.

17. The communication terminal as claimed in claim 15, wherein the external system is configured to track the positions of a plurality of communication terminals.

18. The broadcasting system as claimed in claim 8, wherein
the size of the desired area is either a first size or a second size, the second size being smaller than the first size; and
the at least one communication terminal is further configured to determine that the positional information indicates the current position of the communication terminal when the range information indicates the second size.

19. The broadcasting system as claimed in claim 18, wherein
the at least one communication terminal is further configured to determine that the positional information calculated by the communication terminal with differential positioning indicates the current position of the communication terminal when the range information indicates the first size.

20. The broadcasting system as claimed in claim 8, wherein the positional information and the size of the desired area are stored in a frame conforming to an indoor messaging system standard and broadcast.

* * * * *